United States Patent [19]

Yamashita et al.

[11] Patent Number: 5,501,204
[45] Date of Patent: Mar. 26, 1996

[54] ASSIST AIR CONTROL APPARATUS FOR INTERNAL COMBUSTION ENGINE

[75] Inventors: Yukihiro Yamashita, Kariya; Hisashi Iida, Ama; Keiji Honjoh, Anjoh, all of Japan

[73] Assignee: Nippondenso Co., Ltd., Kariya, Japan

[21] Appl. No.: 269,897

[22] Filed: Jul. 6, 1994

[30] Foreign Application Priority Data

Jul. 6, 1993 [JP] Japan .................................. 5-166873

[51] Int. Cl.⁶ .................................................. F02M 23/12
[52] U.S. Cl. ............................................. 123/588; 123/585
[58] Field of Search .................................... 123/470, 472, 123/531, 533, 585, 588, 590, 339

[56] References Cited

U.S. PATENT DOCUMENTS

| | | | |
|---|---|---|---|
| 4,465,050 | 8/1984 | Igashira et al. | 123/585 X |
| 5,024,201 | 6/1991 | Kobayashi et al. | 123/585 X |
| 5,148,788 | 9/1992 | Saikalis et al. | 123/585 X |
| 5,211,148 | 5/1993 | Furuya et al. | 123/585 X |
| 5,255,658 | 10/1993 | Hoffere et al. | 123/585 X |
| 5,406,919 | 4/1995 | Ikuta et al. | 123/585 X |

FOREIGN PATENT DOCUMENTS

| | | |
|---|---|---|
| 57-54624 | 11/1982 | Japan . |
| 58-195057 | 11/1983 | Japan . |
| 1-96457 | 4/1989 | Japan . |

*Primary Examiner*—Tony M. Argenbright
*Attorney, Agent, or Firm*—Cushman, Darby & Cushman

[57] ABSTRACT

To inhibit an air pulsating sound resulting from the opening and closing of the air control valve in a cold engine and to improve controllability of ISC functions in an assist air supply apparatus. When an engine is cold based on a cooling water temperature sensor, opening control is performed so as to control the amount of supplied assist air by controlling the opening degree of an air control valve. When the engine is warming-up, injection synchronization control is performed, in which opening and closing of the air control valve are controlled in synchronization with fuel injection from the fuel injection valves. Therefore, it is possible to suppress air pulsating noise resulting from the opening and closing the air control valve when the engine is warming up and to improve controllability of ISC functions in an assist air supply apparatus.

13 Claims, 30 Drawing Sheets

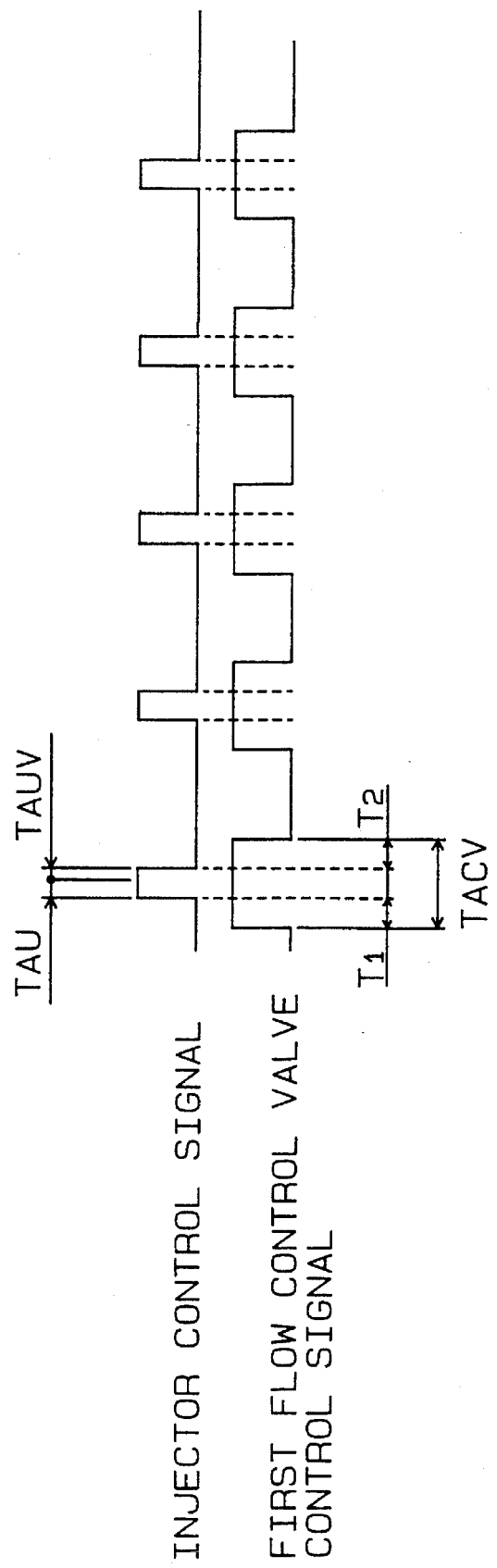

A POSITION

1, #2

B POSITION

3, #4

C POSITION

1, #2     #3, #4

D POSITION

ASSIST AIR CONTROL APPARATUS FOR INTERNAL COMBUSTION ENGINE

BACKGROUND OF THE INVENTION

1. Field of the Invention

The present invention relates to an assist air control apparatus for a fuel injection valve particularly for an internal combustion engine.

2. Description of the Related Art

There is conventionally available, an air assist control apparatus serving also as an idle speed control (ISC) apparatus, as disclosed in Japanese Patent Unexamined Publication No. 58-195,057. According to the disclosure, the apparatus supplies assist air to a fuel injection device by opening and closing a flow control valve, and also supplies air for ISC.

In this conventional control method, however, when a high air flow quantity in idling is required at low temperatures, as opening/closing time interval of the control valve becomes short, it is impossible for the control valve to follow the requirements and thus the controllability of the ISC functions may be deteriorated. In addition, the pulsating noise caused by the intake pulses upon opening or closing the control valve is of a frequency different from that of the pulsating noise caused after warming-up, and special measures against it are necessary.

SUMMARY OF THE INVENTION

An object of the present invention is therefore to ensure ISC controllability during the warming-up of an internal combustion engine, and to eliminate the intake pulsating noise at low temperature.

According to the first aspect of the present invention, as shown in FIG. 1, an assist air control apparatus for an internal combustion engine comprises air introducing passage means defining air introducing portion for introducing from outside air which pressure is higher than that around fuel injection ports and a plurality of air discharging portions for guiding introduced air from said air introducing portion to an opening formed near the fuel injection port for each cylinder, an air control valve disposed in the air introducing passage for opening and closing the air introducing portion, air supply control means for controlling air flow quantity which is supplied from the opening by controlling opening and closing the air control valve, warming-up detecting means for detecting warming-up condition of the engine, and switching means for switching over, in accordance with the warming-up condition, opening control for continuously controlling an opening degree of the air control valve when the engine is cold and injection synchronization control for controlling the air control valve to open and close so as to supply air in synchronization with fuel injection of the fuel injection valve after warming-up.

According to second aspect of the present invention, an assist air control apparatus for an internal combustion engine comprises air introducing passage means defining air introducing portion for introducing from outside air which pressure is higher than that around fuel injection ports, a plurality of first air discharging portions for guiding introduced air from the air introducing portion to a first opening formed near around the fuel injection port for each cylinder, and second air discharging means for guiding introduced air from the air introducing portion to second opening formed in an intake passage at an downstream of a throttle valve, a first air control valve disposed in the air introducing passage for opening and closing a communicating passage between the air introducing portion and the first air discharging portion, a second air control valve disposed in the air introducing passage for continuously controlling an effective cross sectional area of a communicating passage between the air introducing portion and the second air discharging portion, warming-up detecting means for detecting warming-up condition of the engine, and first air supply control means for controlling air flow quantity which is supplied from the first opening by opening control for continuously controlling opening degree of the first air control valve when the engine is cold and injection synchronization control for controlling the first air control valve to open and close so as to supply air in synchronization with fuel injection of the fuel injection valve after warming-up, and second air supply control means for controlling the second air control valve such that quantity of air which is supplied from the second opening into the intake passage become smaller as the warming-up condition is progressing.

BRIEF DESCRIPTION OF THE DRAWINGS

In the accompanying drawings:

FIG. 14 is a time chart showing control signals of the injectors and the first flow control valve used in the embodiment;

DETAILED DESCRIPTION OF THE PREFERRED EMBODIMENTS

A first embodiment in which the flow control valve of the present invention is applied to an air assist apparatus serving also as an idle speed control (ISC) device is described with reference to FIGS. 2 and 3.

Figure 1:
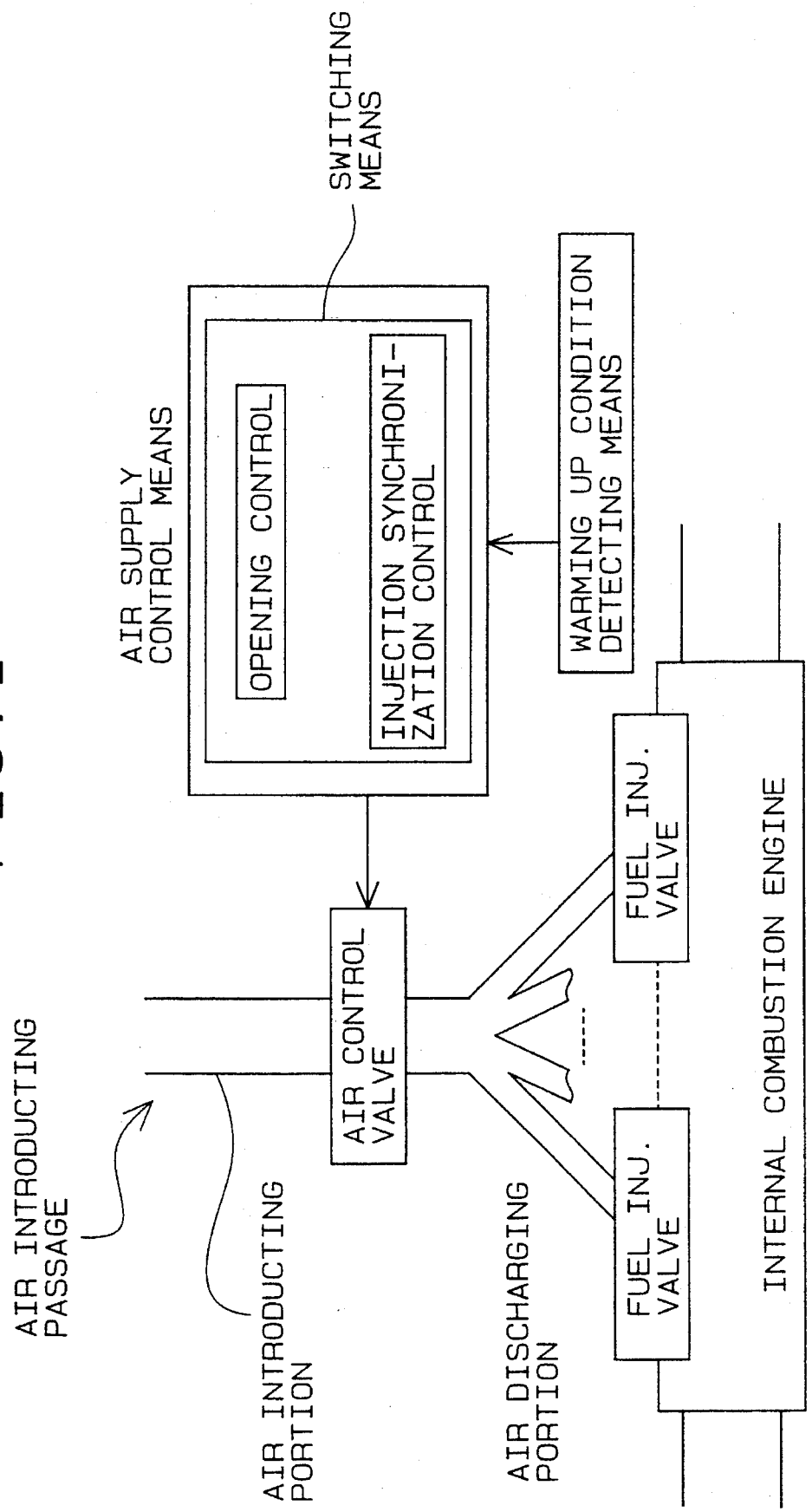
FIG. 1 is a block diagram schematically showing the present invention.
Figure 2:
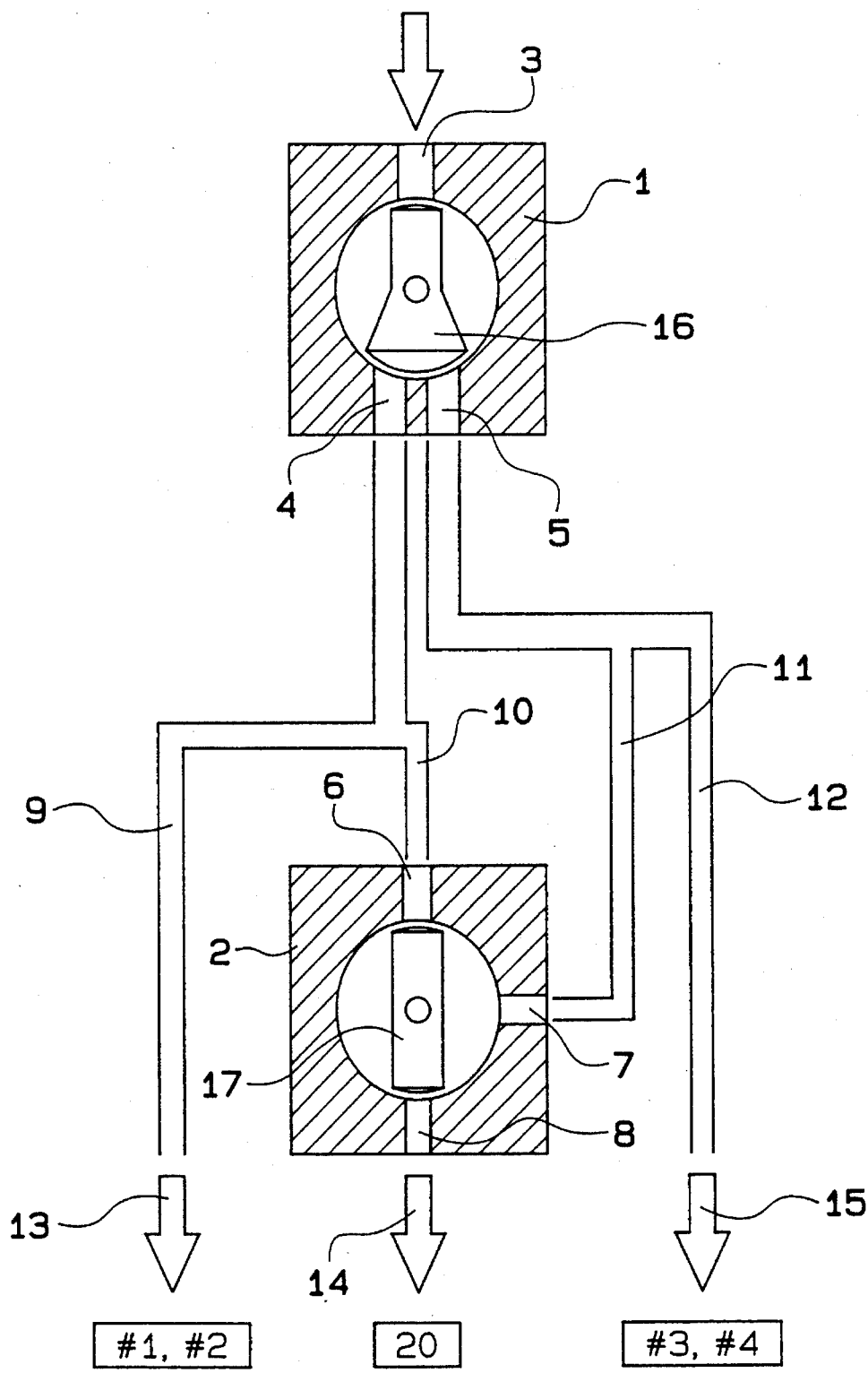
FIG. 2 shows a flow control valve used in a first embodiment of the present invention.
Figure 3:
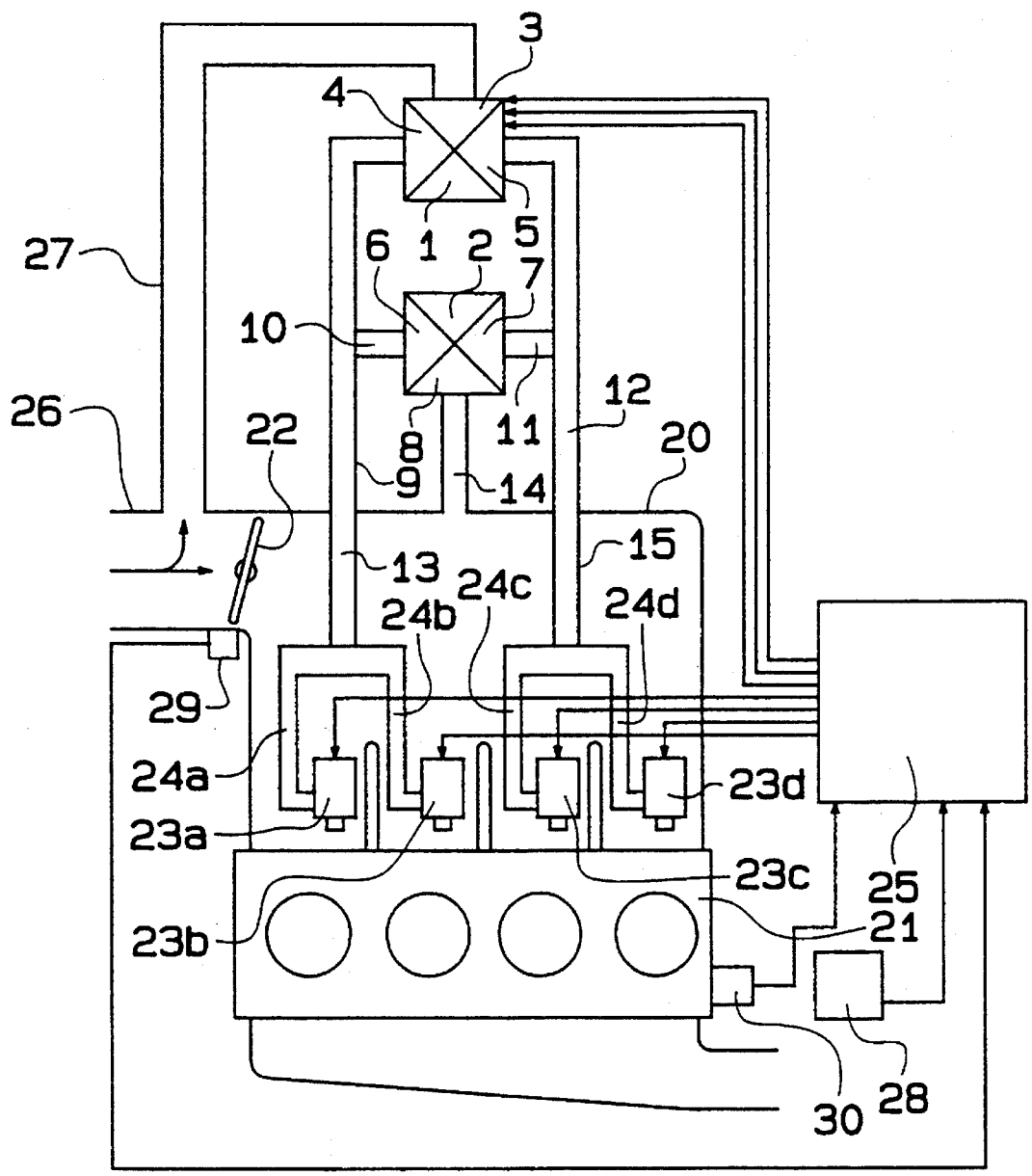
FIG. 3 shows a system in which the first embodiment is applied to a four-cylinder reciprocating engine.

FIG. 2 shows the configuration of the flow control valve of the present invention. FIG. 3 shows configuration in which the present invention is applied to a four-cylinder reciprocating engine. In these drawings, as for each of the reference numerals, 21 denotes an engine main body; 22 is a throttle valve, provided in an intake pipe 26, for controlling the amount of air supplied to the engine 21; 20 is a surge tank which suppresses pulsation of introduced air; 23a to 23d are fuel injecting injectors for the first cylinder, the second cylinder, the third cylinder and the fourth cylinder, respectively, and 24a to 24d are air supply passages for assist air for supplying assist air, which facilitate atomization of fuel injected by the respective injectors 23a to 23d. In the upstream, the air supply passages 24a and 24d communicate with a first fluid outlet port 13, and the air supply passages 24c and 24d communicate with a second fluid outlet port 15.

Further, 1 is a first flow control of a solenoid rotary valve, and 2 is a second flow control valve of a bimetal rotary valve disposed at the downstream of the first flow control valve.

The structures and operations of the individual valves will be described in detail later. The first flow control valve 1 has a first inlet 3 which introduces air through an air intake passage 27 for assist air from the upstream of the throttle valve 22, a first outlet 4 and a second outlet 5. The second flow control valve 2 has a second inlet 6, a third inlet 7 and third outlet 8. The first outlet 4 communicates with a first fluid passage 9 and a second fluid passage 10, and the second outlet 5 communicates with a third fluid passage 11 and a fourth fluid passage 12. The second fluid passage 10 communicates with the second inlet 6, and the third fluid passage 11 communicates with the third inlet 7.

An end of the first fluid passage 9 forms a first fluid outlet port 13 which communicates with the air supply passages 24a and 24b for assist air, and in a similar way, an end of the fourth fluid passage 12 forms a second fluid outlet port 15 which communicates with the air supply passages 24c and 24d for assist air. The third outlet 8 forms a third fluid outlet port 14 which communicates through a fluid passage with the surge tank 20.

The reference numeral 25 denotes an electronic control unit (ECU) which controls operating conditions of the engine 21 by controlling the injectors 23a to 23d, the first flow control valve 1 and the other devices on the basis of input signals from various sensors such as the rotation angle sensor 28 which detects a crank angle, the throttle opening sensor 29 which detects an opening of the throttle valve 22 and also serves as an idle switch, and the cooling water temperature sensor 30 which detects the cooling water temperature.

Figure 4:
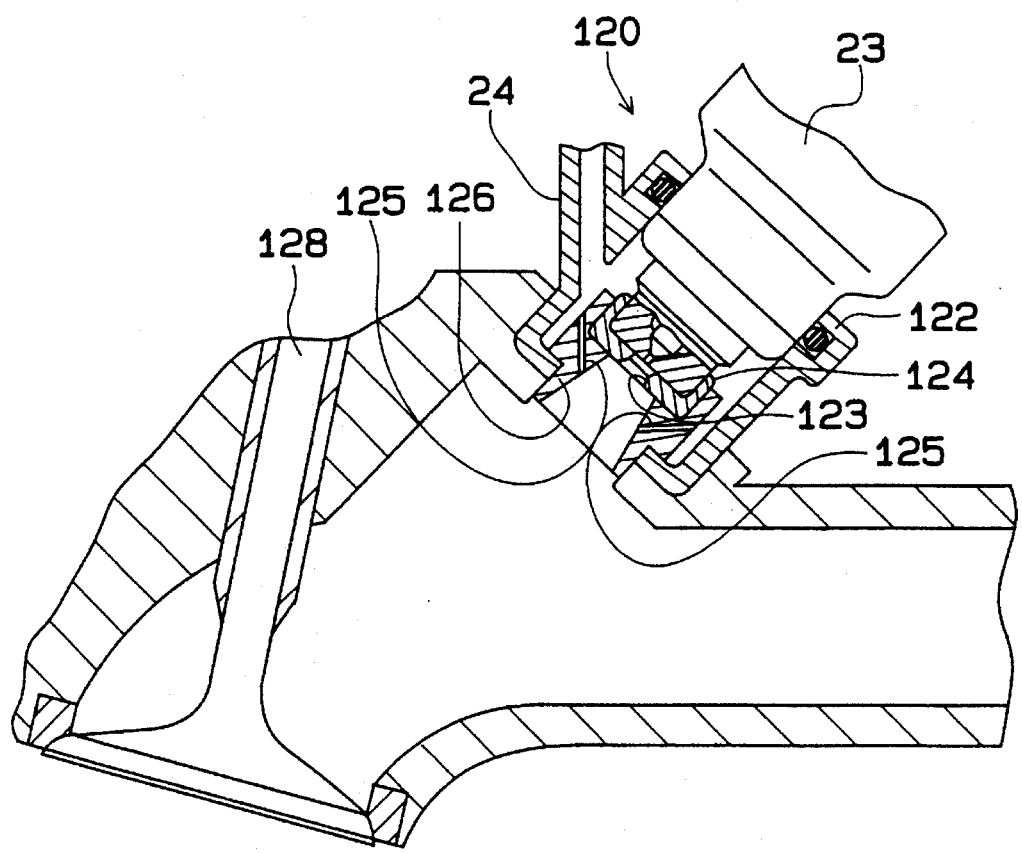
FIG. 4 is a sectional view showing an air mixture socket provided around the injection ports of the fuel injection valve.

An air mixture socket 120 for efficiently mixing the fuel injected from the fuel injecting valve 23 and air introduced through the first and second flow control valves 1 and 2 (hereinafter referred to as "mixing air") is provided on the side end portion of the fuel injecting valve 23 at the exit of the air supply passage 24, as shown in FIG. 4. This air mixture socket 120 is composed of a holding section 122 for holding a tip end of the fuel injecting valve 23 so as to keep an air-tight condition therebetween, a fuel injection opening portion 124 bored with a port 123 for introducing the fuel injected from the fuel injection valve 23 into intake ports #1 to #4 of the individual cylinders of the internal combustion engine, and an air injection opening portion 126 bored with a plurality of ports 125 for introducing mixing air having passed through the air supply passage 24 to the portion surrounding the intake port side of the fuel injection opening portion 124, and attached to intake ports #1 to #4 of the respective cylinders. The total cross-sectional area of the ports 125 of the air injection portion 126 of the air mixture socket 120 is set so as to be substantially one third the passage cross-sectional area of the air supply passage 24.

Therefore, if the first and second flow control valves 1 and 2 are open during operation of the internal combustion engine when the intake ports #1 to #4 of the cylinders are under negative pressures, part of the air having come into the intake pipe 26 flows into the air mixture socket 120 through the air intake passage 27 under the effect of differential pressure between upstream pressure of the throttle valve 22 and pressure (negative) at the intake ports, is injected from the ports 125 provided in the air injection opening portion of the air mixture socket 120, and collides with the fuel injected from the fuel injecting valve 23, thus atomizing the injected fuel. Since the total cross-sectional area of the ports 125 of the air injection opening portion 126 is set to about a third the cross-sectional area of the air supply passage 23 as described the above, each port 125 serves as a restriction, thus increasing the flow velocity of the mixing air, and the kinetic energy thereof promotes atomization of the injected fuel. In FIG. 4, the reference numeral 128 denotes intake valves #1 to #4 of the cylinders of the internal combustion engine.

Figure 5:
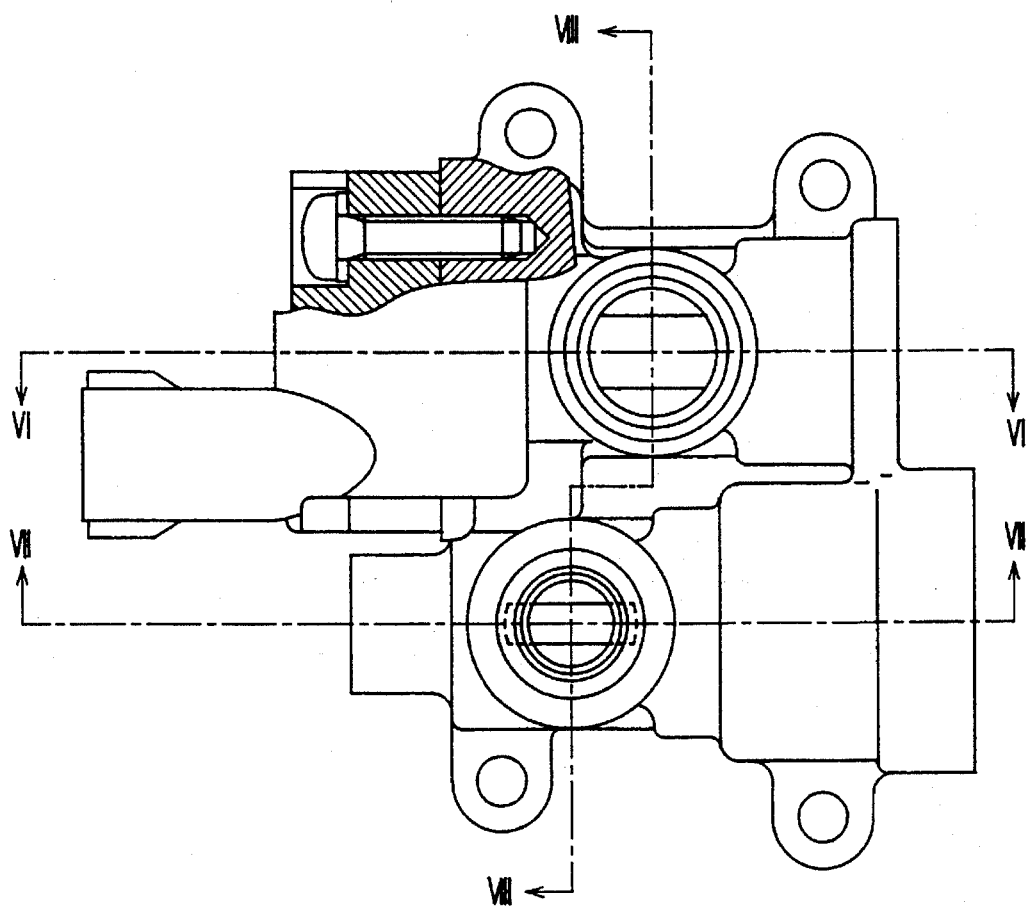
FIG. 5 is a plan view showing the flow control valve used in the first embodiment.
Figure 9:
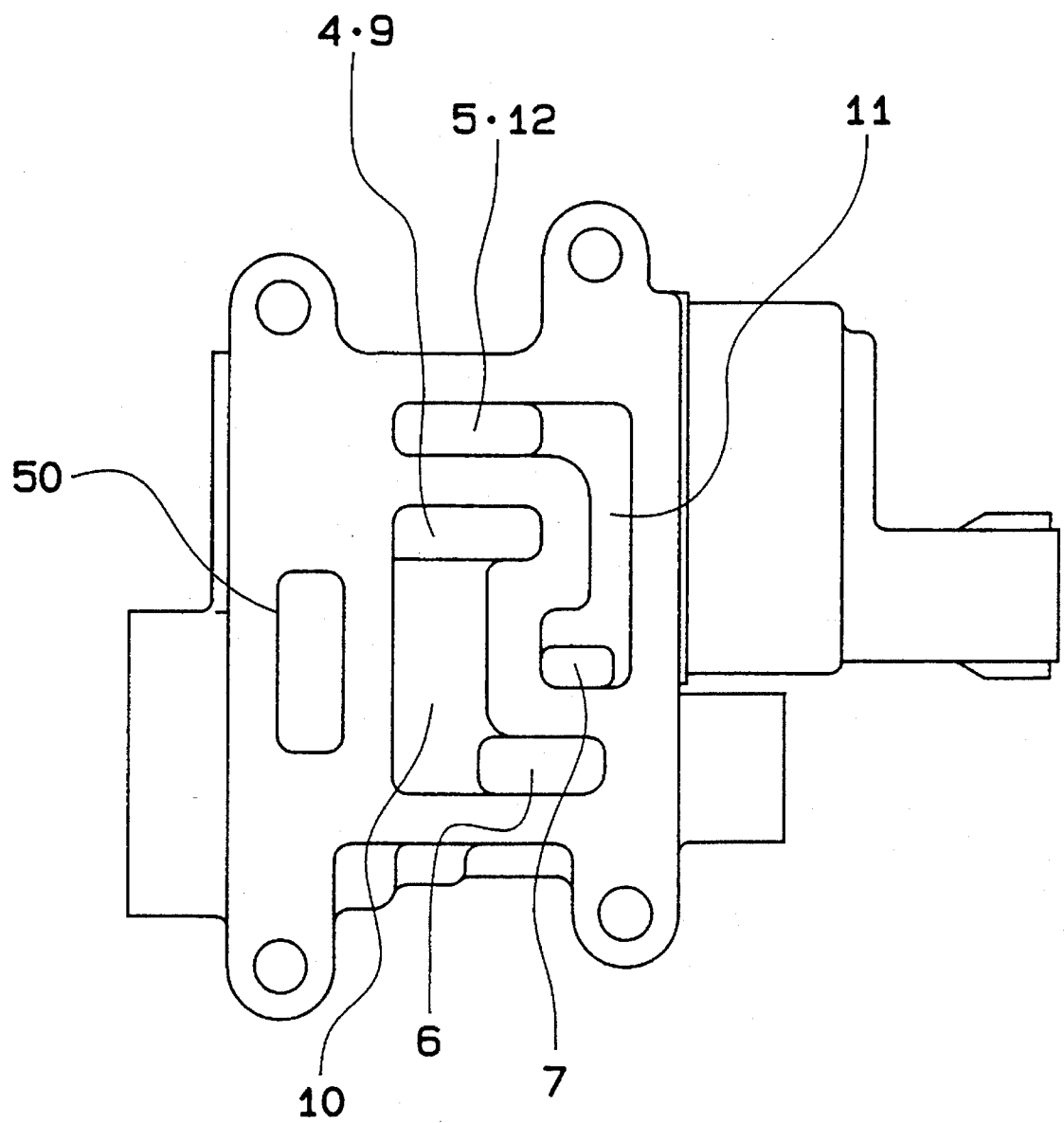
FIG. 9 is a side view on the opposite side of FIG. 5.

The structure of the first and second flow control valves 1 and 2 is described. While the first flow control valve 1 and the second flow control valve 2 may be manufactured individually, mountability and air responsibility are improved in the first embodiment by integrating these valves as one unit as shown in FIGS. 5 and 9. Also in the first embodiment, a solenoid rotary valve is used as the first flow control valve 1, and a bimetal rotary valve, as the second flow control valve 2.

Figure 6:
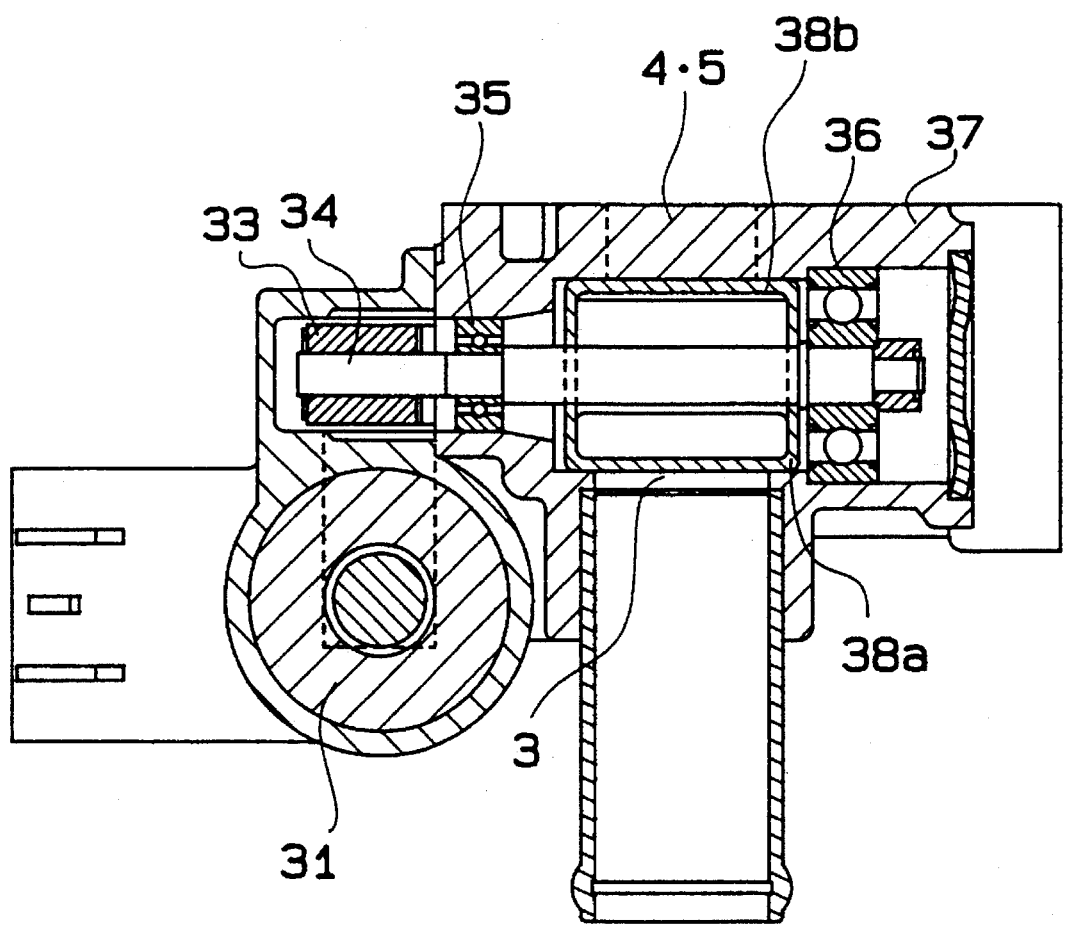
FIG. 6 is a sectional view taken along the line VI—VI of FIG. 5.
Figure 8:
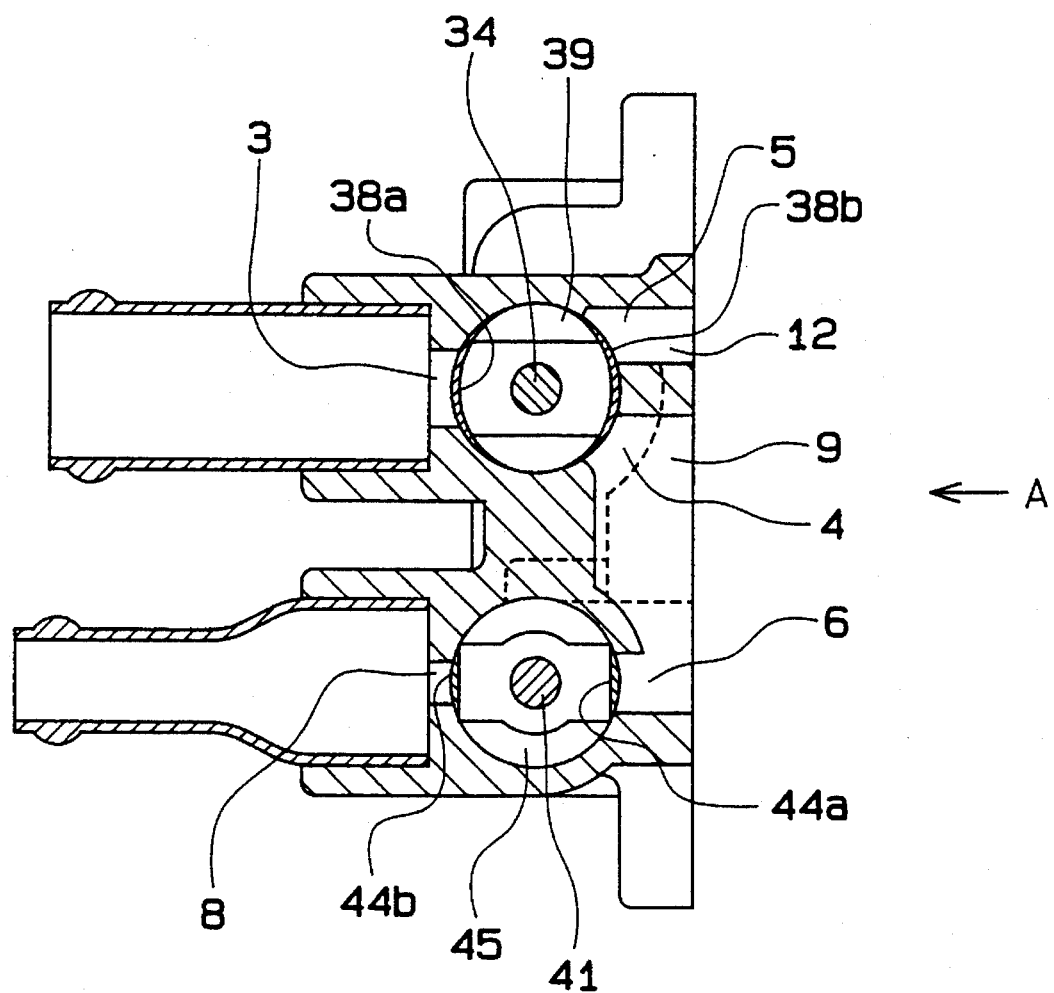
FIG. 8 is a sectional view taken along line VIII—VIII of FIG. 5.

First, the structure of the first flow control valve 1 is described with reference to FIGS. 6 and 8. FIG. 6 is a cross-sectional view taken along the line IV—IV of FIG. 5. FIG. 8 is a cross-sectional view taken along the line VIII—VIII of FIG. 5. In FIG. 6, 31 is an electromagnetic coil device for actuating the first flow control valve 1, 33 is a magnet which swings depending upon the supply of electricity through the electromagnetic coil device 31, 34 is a first shaft fixed to the magnet 33, which rotates in accordance with the rotation of the magnet 33, and 35 and 36 are first and second bearings for rotatably supporting the shaft 34 are secured to a housing 37.

Further, 38a is a first valve which is fixed to the first shaft 34 and opens and closes a first inlet 3, and 38b is a second valve which is fixed to the first shaft 34 and opens and closes the second outlet 5. The first and second valves 38a and 38b makes the first inlet 3 of the first flow control valve communicate with the first outlet 4 or second outlet 5, as shown in FIG. 8.

At this time, communication between the first outlet 4 and the second outlet 5 is prevented. More specifically, when the first shaft 34 rotates anticlockwise in FIG. 8 and the first valve 38a makes the first inlet 3 communicate with a first valve chamber 39, the second valve 38b makes the first outlet 4 communicate with the first valve chamber 39. When the first shaft 34 rotates clockwise and the first valve 38a makes the first inlet 3 communicate with the first valve chamber 39, the second valve 38b makes the second outlet 5 communicate with the first valve chamber 39.

Figure 7:
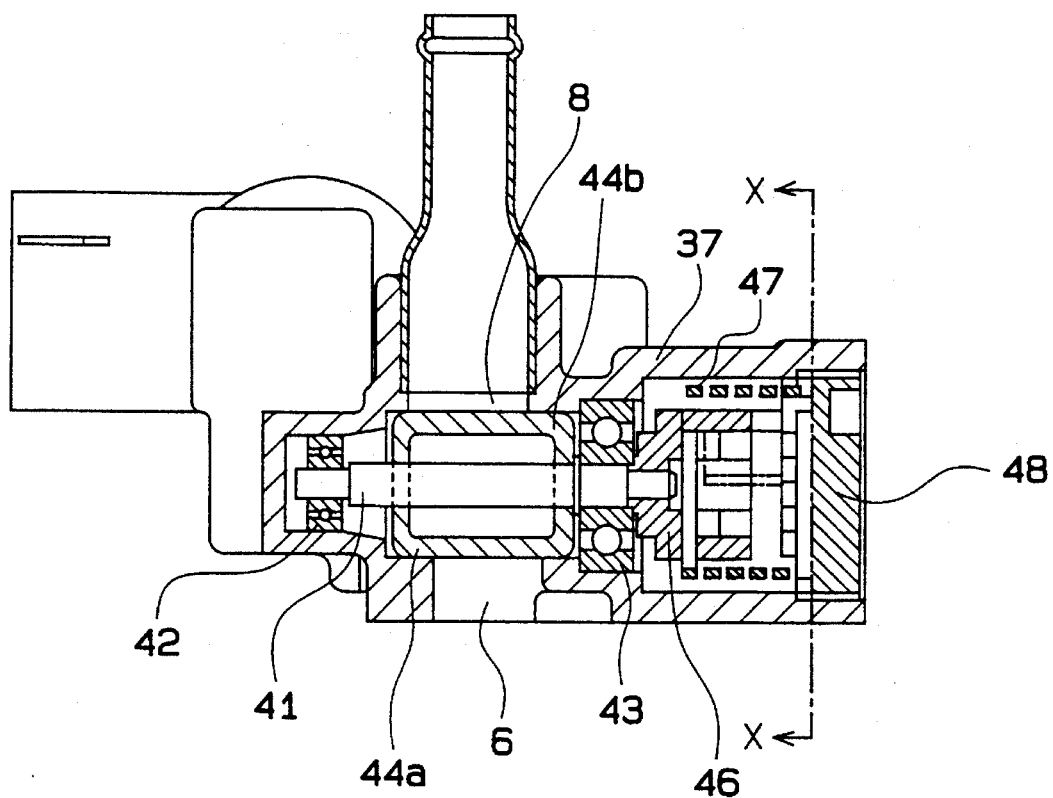
FIG. 7 is a sectional view taken along the line VII—VII of FIG. 5.
Figure 10:
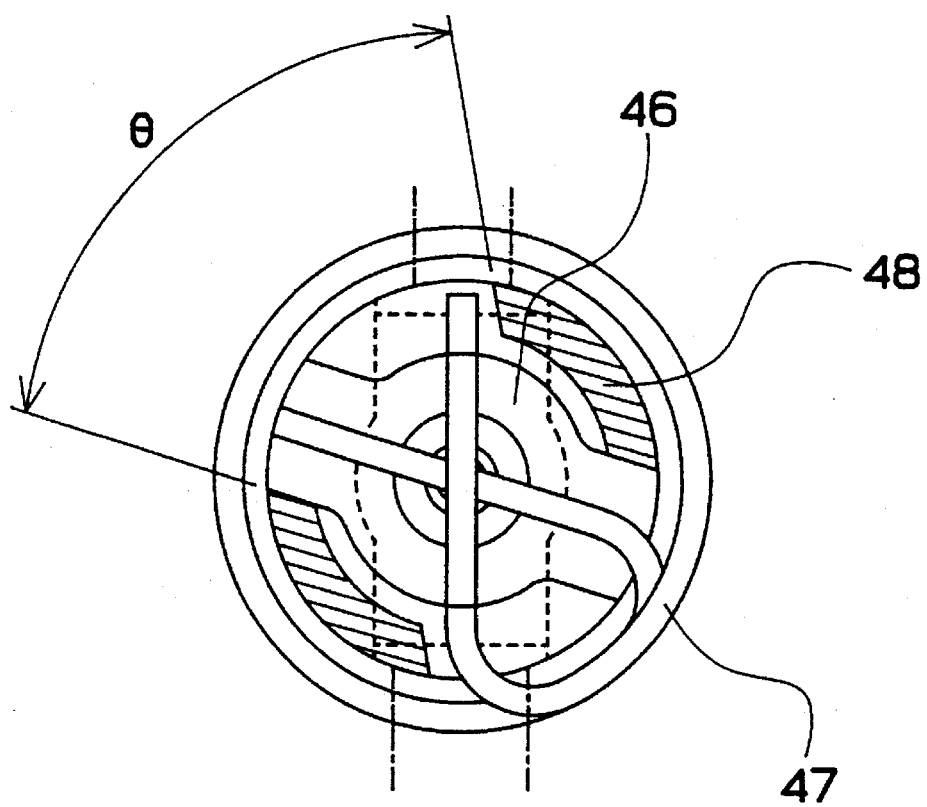
FIG. 10 is a sectional view taken along the line X—X of FIG. 5.

Next, the structure of the second flow control valve is described with reference to FIGS. 7, 8 and 10. FIG. 7 is a cross-sectional view taken along the line VII—VII of FIG. 5, and FIG. 10 is a cross-sectional view taken along the line X—X of FIG. 7.

In FIG. 7, 41 is a second shaft, 42 and 43 are third and fourth bearings for rotatably supporting the shaft 41 and are fixed to a housing 37, 44a is a third valve which is fixed to the shaft 41 and opens and closes a second inlet 6, and 44b is a fourth valve which is fixed to the second shaft 41 and opens and closes an outlet 8. The third and fourth valves 44a and 44b are set such that the second inlet 6 and the third outlet 8 of the second flow control valve simultaneously open as shown in FIG. 8. More specifically, when the second shaft 41 rotates clockwise in FIG. 8 and the third valve 44a makes the second inlet 6 communicate with a second valve chamber 45, the fourth valve 44b makes the outlet 8 communicate with the second valve chamber 45. The reference numeral 46 denotes a stopper fixed to the second shaft, and 47 is a bimetal member which deforms as shown in FIG. 10 when heated by the hot water passage 50 through which cooling water of the engine 21 passes as shown in FIG. 9, an end of which engages with the stopper 46 and the other end of which engages with a holder bimetal 48 connected with screws to the housing 37. The range of rotation of the stopper 46 is limited by the holder bimetal 48 as shown in FIG. 10 (indicated by θ in FIG. 10). That is, this limits the opening/closing angle of the third and fourth valves 44a and 44b.

The relationship between the first flow control valve 1 and the second flow control valve 2 is described with reference to FIGS. 8 and 9. FIG. 9 is a side view on the opposite side of FIG. 5.

The first outlet 4 communicates with a first fluid passage 9 and a second fluid passage 10, and the second fluid passage 10 further communicates with the second inlet 6. The second outlet 5 communicates with a third fluid passage 11 and a fourth fluid passage 12, and the third fluid passage 11 further communicates with a third inlet 7.

The method of actuating the first flow control valve 1 is described in the following paragraphs with reference to FIGS. 11 and 12.

The electromagnetic coil device used for actuating the first flow control valve 1 has a first exciting coil 311 and a second exciting coil 312 generating magnetic fluxes in directions opposite to each other, which are composed of bifilar wound coils, for example, are manufactured by simultaneous winding.

Figure 11:
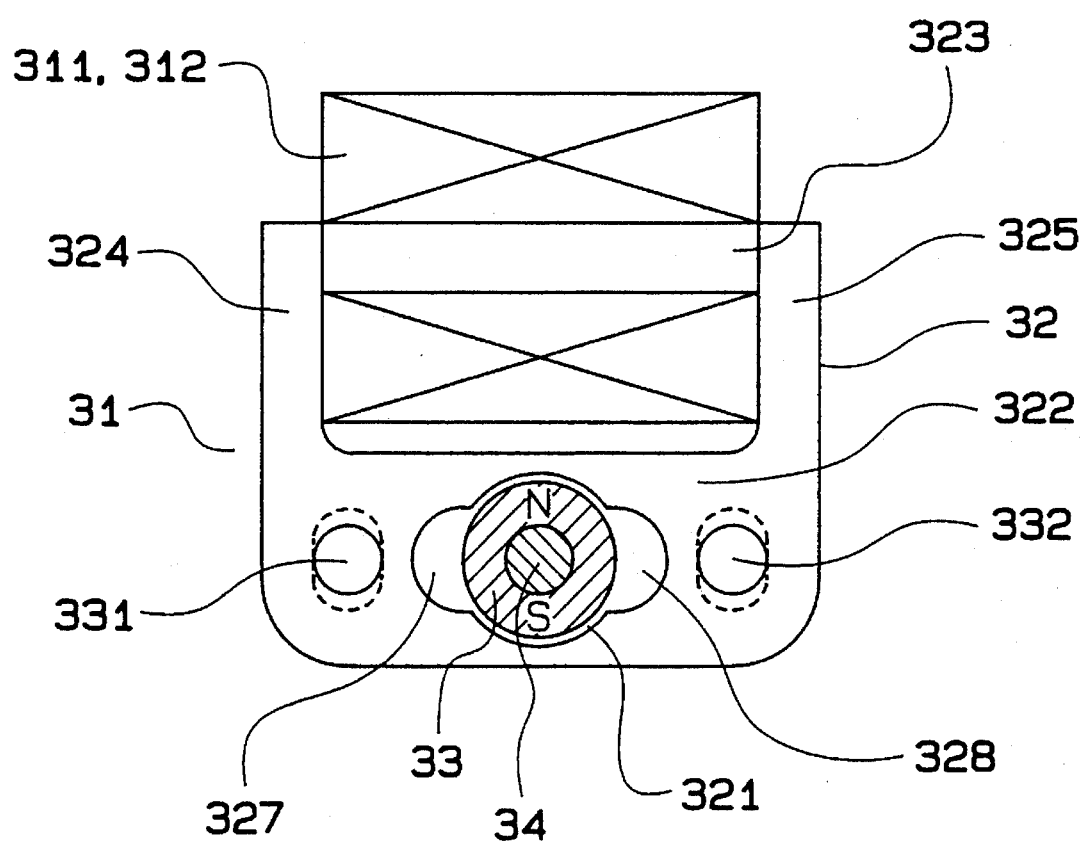
FIG. 11 shows the electromagnetic coil device used in the embodiment.

FIG. 11 shows the structure of the electromagnetic coil device 31. The magnet 33 incorporated into the electromagnetic coil device 31 is formed in a cylindrical shape so as to fit in the first shaft 34, and N and S magnetic poles are disposed at both ends of a line passing along the axis. A core 32 composing the electromagnetic coil device 31 is provided with a first core 322 in which a circular opening 321 is formed to permit insertion of the magnet 33 portion of the shaft 34, and a second core 323 disposed in parallel with the first core 322. A closed circuit is formed by connecting the both ends of the first core 322 and the second core 323 with third and fourth cores 324 and 325. Exciting coils 311 and 312 are wound on the second core 323.

The above-mentioned circular opening 321 is made slightly larger than the outer diameter of the magnet 33, and first and second detent grooves 327 and 328 are formed on both sides along the extension of the first core 322 of this opening 321, i.e., in the direction that magnetic flux passes. First and second attachment holes 331 and 332 for inserting screws for attaching the electromagnetic coil device 31 to the housing 37 are formed at positions close to the both ends particularly of the first core 322 of the core composing the electromagnetic coil device 31. The first and second attachment holes 331 and 332 are provided in a condition so as to limit the area of the flux passage in the closed circuit shape. The area where the flux passes can be adjusted by changing the size of these first and second attachment holes 331 and 332.

In this electromagnetic coil device 31, rotation force is given to the magnet 33 by magnetic flux generated corresponding to the amount of exciting electric current flowing to the first and second coils 311 and 312. In a condition that exciting current is not given to the first and second exciting coils 311 and 312, the magnet 33 is brought into the condition as shown in FIG. 12A. More specifically, the magnetic flux density around the magnet 33 is made non-uniform by the first and second detent grooves 327 and 328. A non-uniform portion is caused in the magnetic flux loop, and N and S magnetic poles of the magnet 33 are disposed opposite each other at positions between the first and second detent grooves 327 and 328, i.e., at positions with the smallest distance between the cores.

Figure 12B:
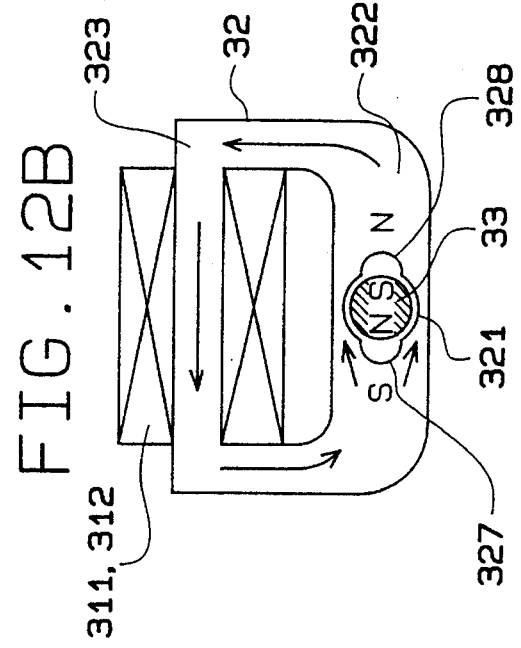
FIGS. 12A to 12D show the electromagnetic coil device used in the embodiment for explaining operation thereof.
Figure 12D:
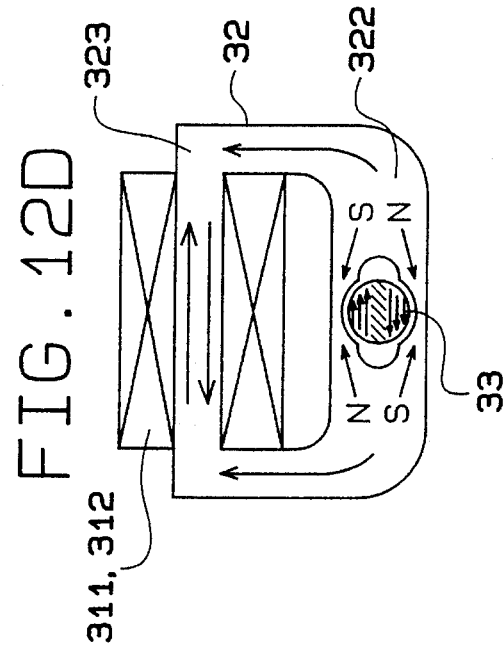
Figure 12A:
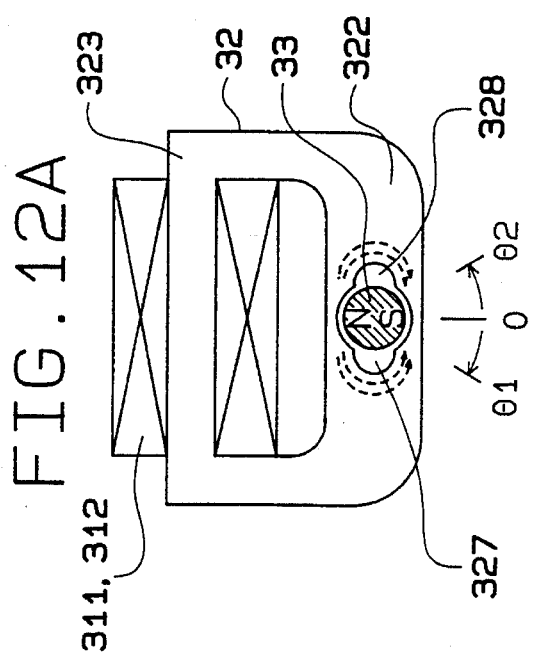
Figure 12C:
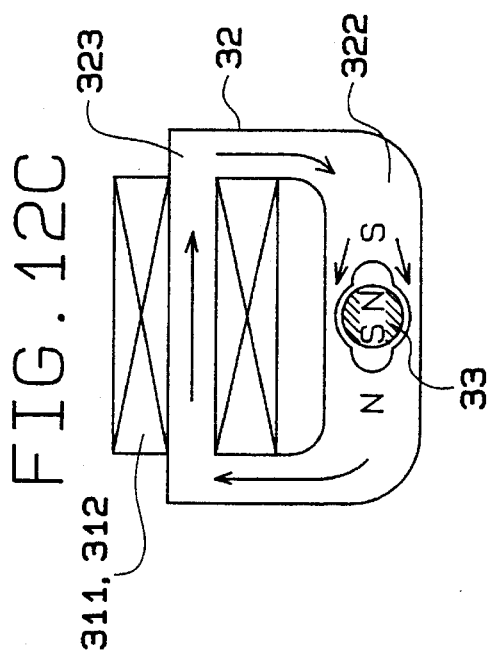

When exciting current is supplied to the first coil 311, for example, a magnetic flux loop as indicated by the arrow in FIG. 12B is formed. In this case, the cross-sectional area of the first core 322 becomes smaller on the side portion of the circular opening 321, and the magnetic flux is saturated at this portion. As a result, part of the magnetic flux of the first core 322 passes through the magnet 33, and S and N magnetic poles are formed respectively on the sides of the first and second detent grooves 327 and 328, thus permitting rotation of the magnet 33 as shown in FIG. 12B (anticlockwise rotation). When exciting current is supplied to the second coil 312, a magnetic flux loop as indicated by the arrow in FIG. 12C is formed in contrast to the above case, and the magnet 33 rotates in the opposite direction as shown in FIG. 12C (clockwise rotation). When exciting current is supplied simultaneously to both the first and second coils 311 and 312 as shown in FIG. 12D, the magnet 33 is disposed at the position of a rotation angle corresponding to the ratio of the amount of electric current flowing to the both coils 311 and 312.

In the first embodiment, the amount of air supply from the first flow control valve 1 is determined by controlling the time of the exciting current to the first and second coils 311 and 312 of the first flow control valve 1.

Next, the control routine executed by the ECU 25 for the injectors 23a to 23d and the first flow control valve 1, is described below.

Figure 13A:
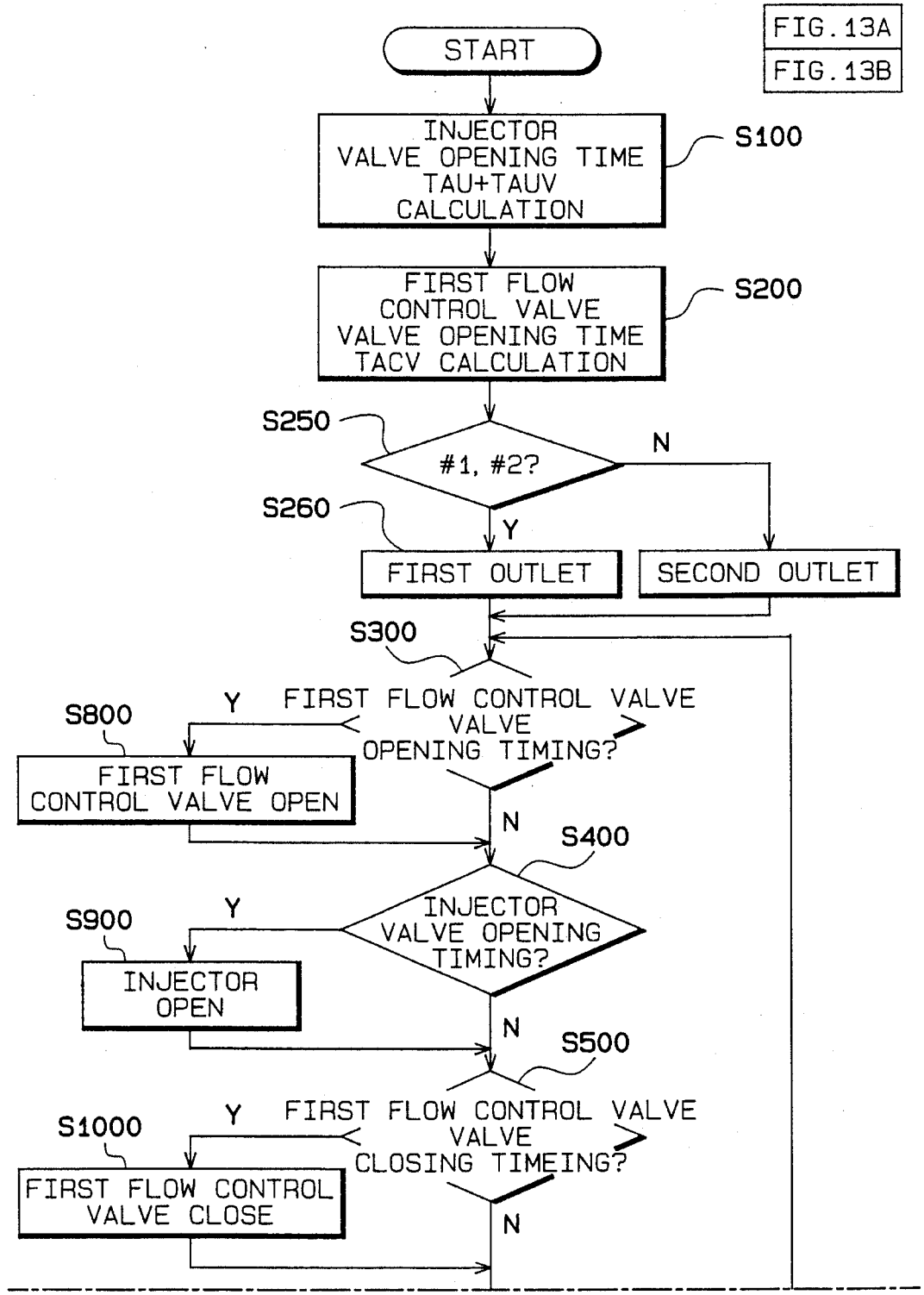
FIGS. 13A and 13B are flowcharts showing the control routine of the injectors and the first flow control valve executed by the ECU used in the embodiment.
Figure 13B:
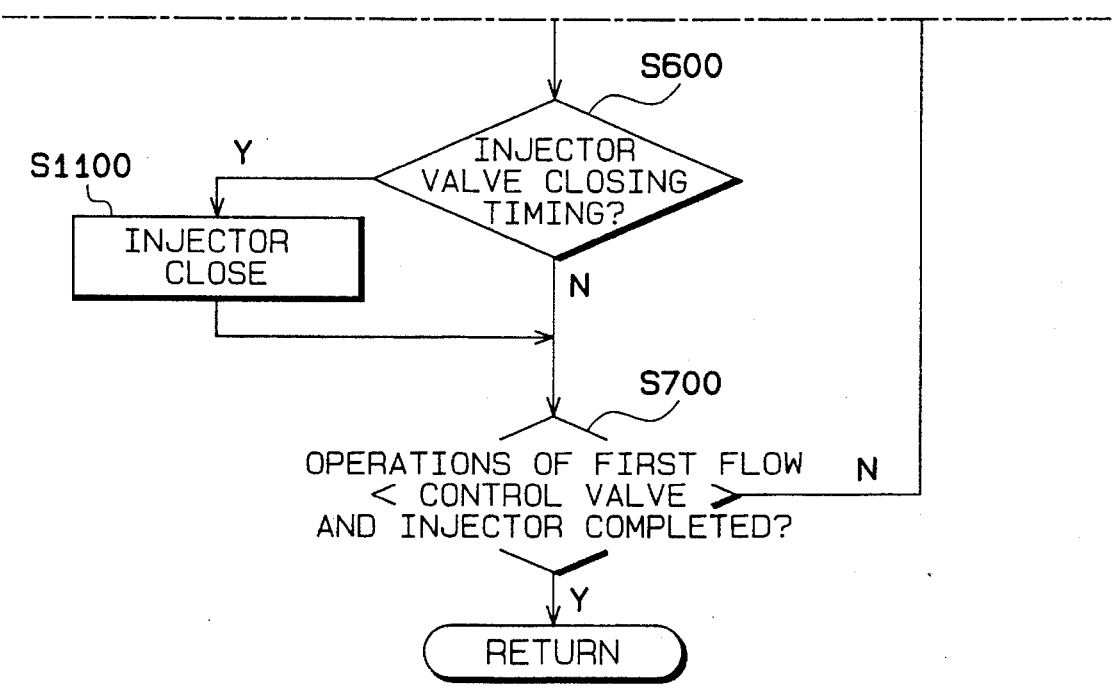

FIG. 13 is a flowchart showing a control routine of the injectors 23a to 23d and the first flow control valve 1 executed by the ECU 25 of the fuel injecting device of the four-cylinder reciprocating engine 21 in the first embodiment of the present invention. FIG. 14 is a time chart showing control signals of the injectors 23a to 23d and the first flow control valve 1 of the four-cylinder reciprocating engine in the first embodiment of the present invention.

The routine shown in FIG. 13 is executed at a predetermined timing, for example, every 180° of crank angle. First, the ECU 25 calculates valve opening time for each of the injectors 23a to 23d corresponding to the amount of injected fuel at the step S100.

That is to say, as is generally known, the ECU 25 calculates the basic quantity of injection Q/Ne by dividing the quantity of air intake Q as measured by an air flow meter by the revolutions Ne of the engine 21 as detected by a rotation angle sensor 28, and calculates the valve opening time TAU for each of the injectors 23a to 23d by multiplying the calculated basic quantity of injection Q/Ne by various correction coefficients corresponding to cooling water temperature detected by a cooling water temperature sensor 30, the intake air temperature measured by an intake air temperature sensor and the air/fuel ratio signal output from an oxygen concentration sensor. Furthermore, the valve opening time TAU+TAUV, which is the exciting time for each of the injectors 23a to 23d, is calculated by adding the invalid injection time TAUV previously mapped corresponding to the battery voltage.

Then, at the step S200, the valve opening time TACV, which is the exciting time of the first flow control valve 1, is calculated. While details will be described later, the valve opening time TACV of the first flow control valve 1 is calculated by adding the rise correction time T1 which represents how much time opening of the first flow control valve 1 should precede the valve opening timing of the injectors 23a to 23d, and the fall correction time T2 which represents how much time closing of the first flow control valve 1 should be delayed from the valve closing timing of the injectors 23a to 23d.

At the step S250, it is determined whether or not the first cylinder (#1) or the second cylinder (#2) is the next cylinder into which fuel is injected. If so, exciting current is supplied at the step S260 to the electromagnetic coil device 31 so as to open the first outlet 4 at the valve opening timing of the first flow control valve 1 described in the following steps. If not, i.e., if it is the timing when the third cylinder (#3) or the fourth cylinder (#4) is to be injected fuel, proceeds to the step S270. Exciting current is supplied to the electromagnetic coil device 31 so as to open the second outlet 5 at the opening timing of the first flow control valve 1 as described in the following steps, and then proceeds to the step 300. The following step is executed for the cylinder which has been determined to be next cylinder into which fuel is injected.

Subsequently, the ECU 25 determines, at the step S300, whether or not the valve opening timing of the first flow control valve 1, i.e., the timing preceding by the above-mentioned rise correction time T1 to the predetermined valve opening timing of the injectors 23a to 23d (by a crank angle of BDTCZ5° CA) has been reached. If the timing has not yet been reached, proceeds to the step S400, and it is determined whether or not the valve opening timing of the injectors 23a to 23d has been reached. Because the injectors 23a to 23d are constantly delayed to open from the first flow control valve 1, it is determined at this point that the valve opening timing of the injectors 23a to 23d has not yet been reached, and proceeds to the step S500. Then, at the step S500, it is determined whether or not the valve opening timing of the first flow control valve 1 has been reached. Since the first flow control valve 1 has not yet been open, it is determined that the valve closing timing has not yet been reached, and proceeds to the step S600. Then, at the step S600, it is determined whether or not the valve closing timing of the injectors 23a to 23d has been reached. Because the injectors 23a to 23d have not yet been open, the valve closing timing is determined not to have been reached, proceeds to the step S700. At this step, it is determined whether or not. opening/closing operations of the first flow control valve 1 and the injectors 23a to 23d have been completed. Since the operations have not yet been completed, returns to the step S300, and the steps S300 to S700 are repeated.

When the valve opening timing of the first flow control valve 1 is determined at the step S300 to have been reached, a control signal to the first flow control valve 1 is raised at the step S800 to open the valve, and then, the steps S300 to S700 are again repeated as shown in FIG. 13. Then, when the valve opening timing of the injectors 23a to 23d is determined to have been reached at the step S400 after a rise correction time T1 passes, a control signal is raised to the injectors 23a to 23d at the step S900. When it is determined that the valve closing timing of the injectors 23a to 23d has been reached at the step S600 after the valve opening time TAU+TAUV passes since the injectors 23a to 23d was open, a control signal is issued to the injectors 23a to 23d at the step S1100 to close the valve. Thereafter, when the valve closing timing of the first flow control valve 1 is determined to have been reached at the step S500, a control signal is issued to the first flow control valve 1 at the step S1000 to close the valve, and the opening/closing operations of the first flow control valve 1 and the injectors 23a to 23d are determined to have been completed at the step S700, and terminates the routine.

The above description was made for the case that a positive value is set as the rise correction time T2, and that the first flow control valve 1 is closed after the injectors 23a to 23d has been closed. There may be a case that a negative value is set as the fall correction time T2 depending upon the operation condition of the engine 21. In such a case, the first flow control valve 1 is closed, preceding the closing of the injectors 23a to 23d at the step S1100, at the step S1000.

Next, the routine for calculating the valve closing time TACV of the first flow control valve 1 executed by the ECU 25 at the step S200 of the above-mentioned control routine is described.

Figure 15:
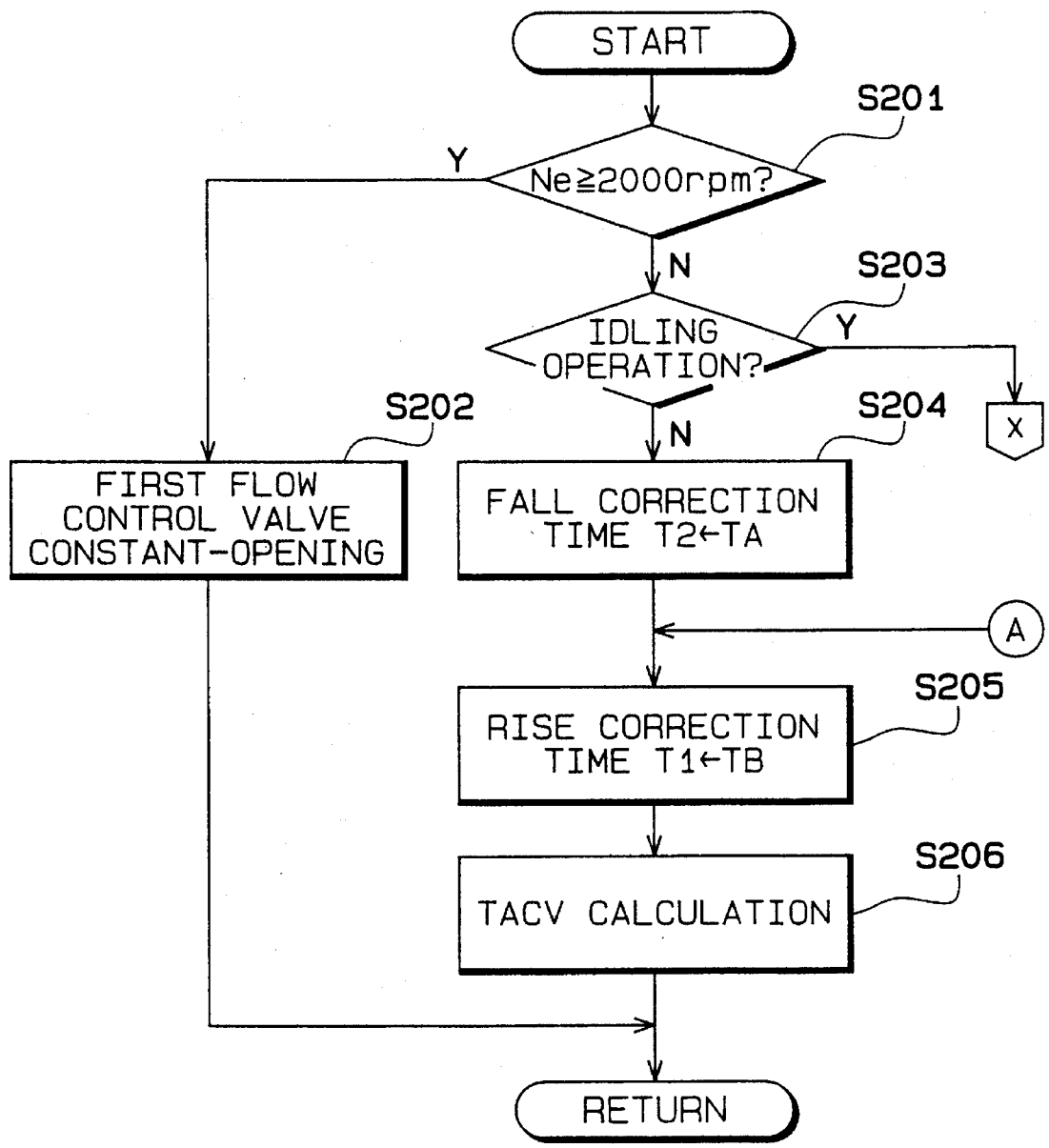
FIG. 15 is a flowchart showing the calculation routine of the valve opening time of the first flow control valve executed by the ECU in the embodiment.
Figure 16:
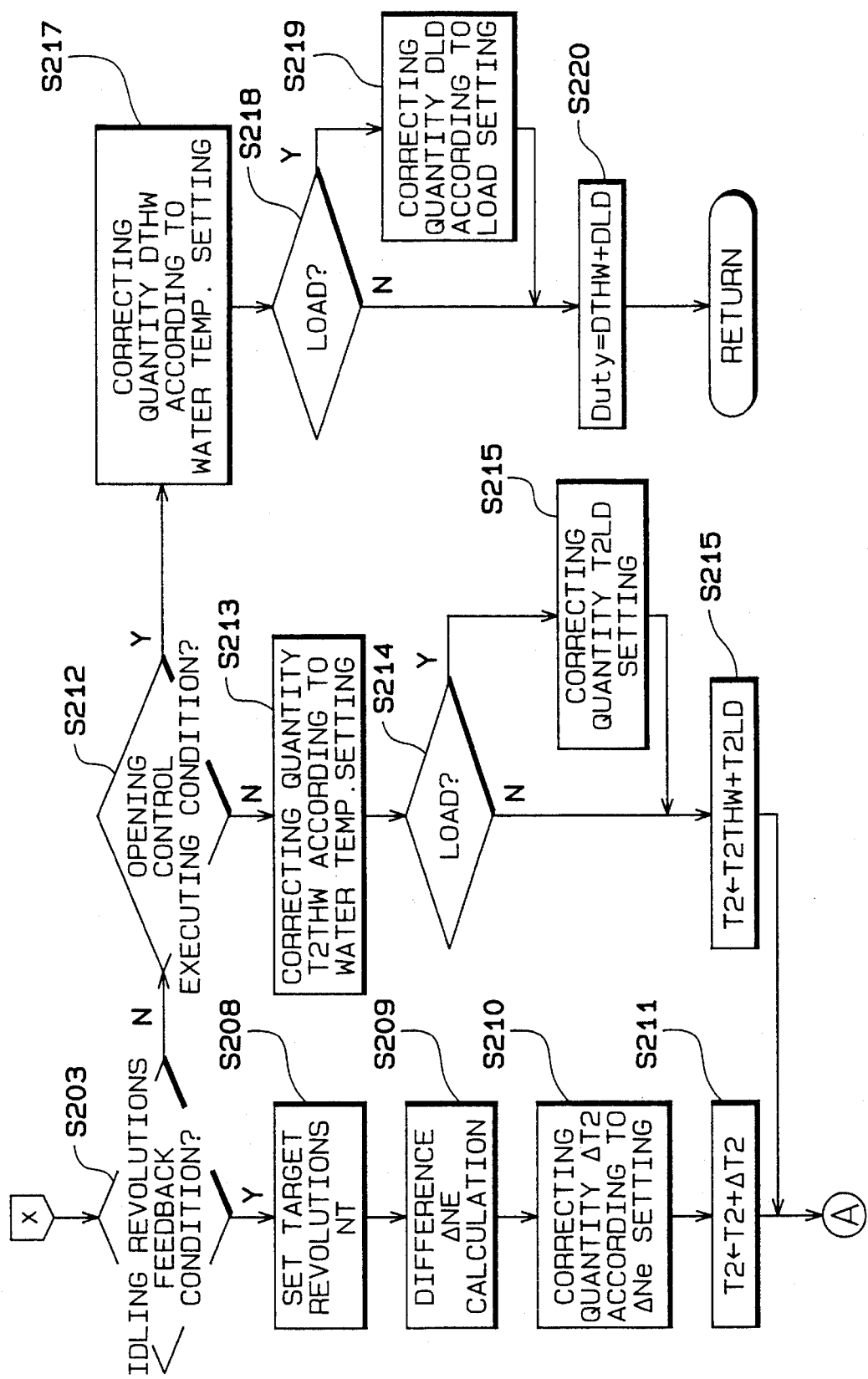
FIG. 16 is a flowchart showing the calculating routine of the valve closing time of the first flow control valve executed by the ECU in the embodiment.
Figure 17:
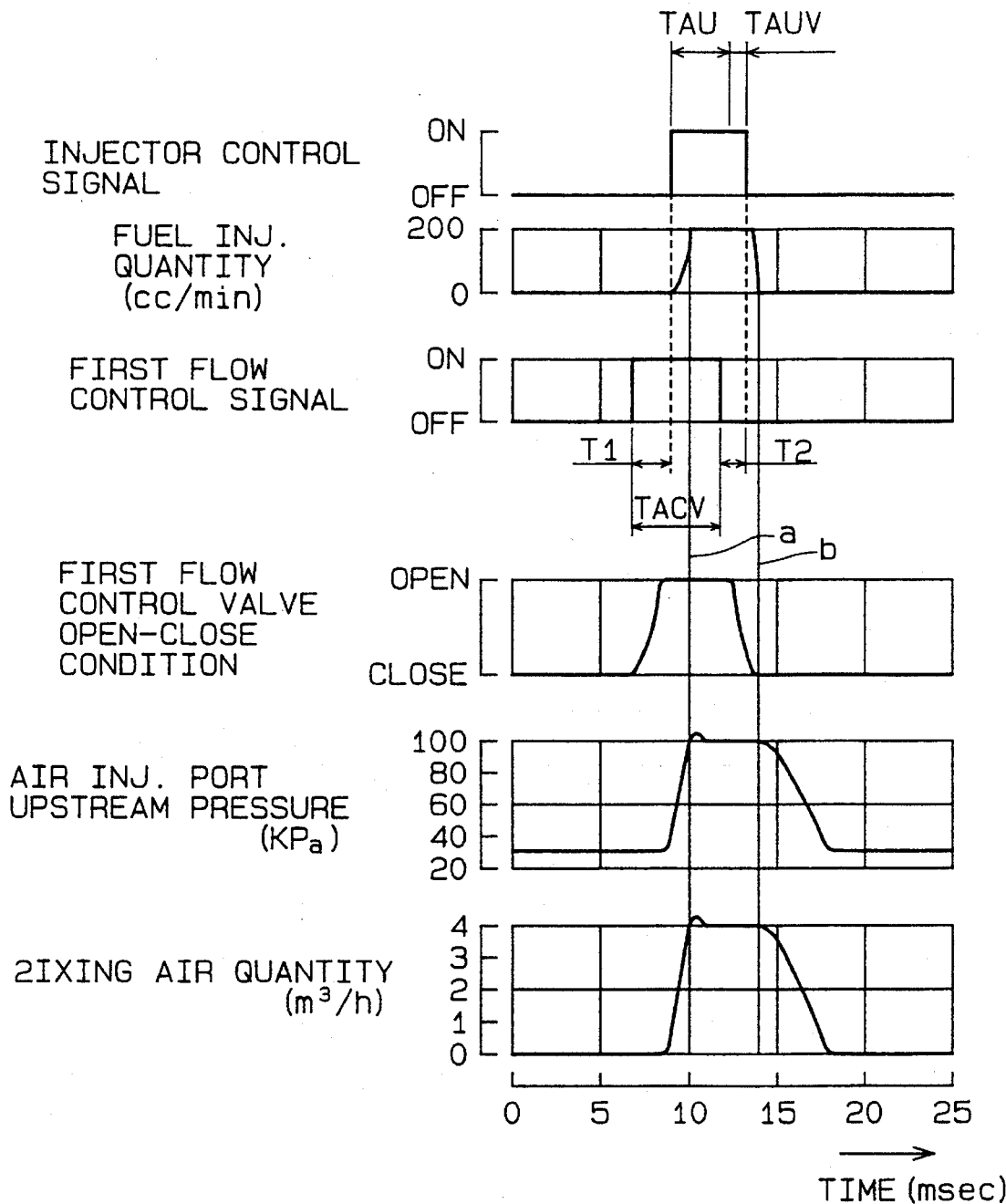
FIG. 17 is a timing chart in which supply of mixing air is synchronized with actual fuel injection of the fuel injection device of the engine of the embodiment.
Figure 18:
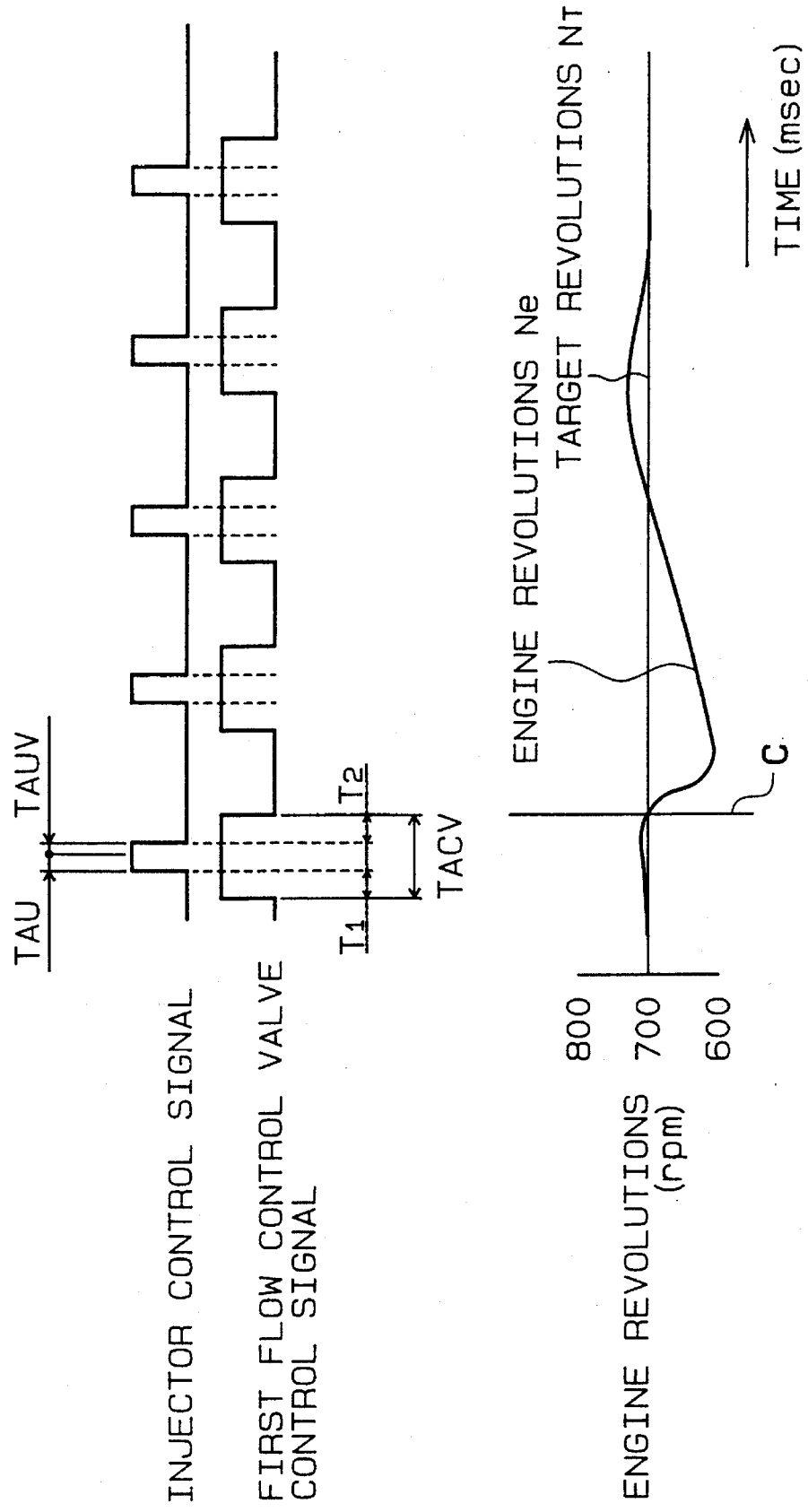
FIG. 18 is a timing chart showing control signals of the injectors and the first flow control valve when revolutions are lowered by starting under load of the fuel injection device of the engine in the embodiment.
Figure 19:
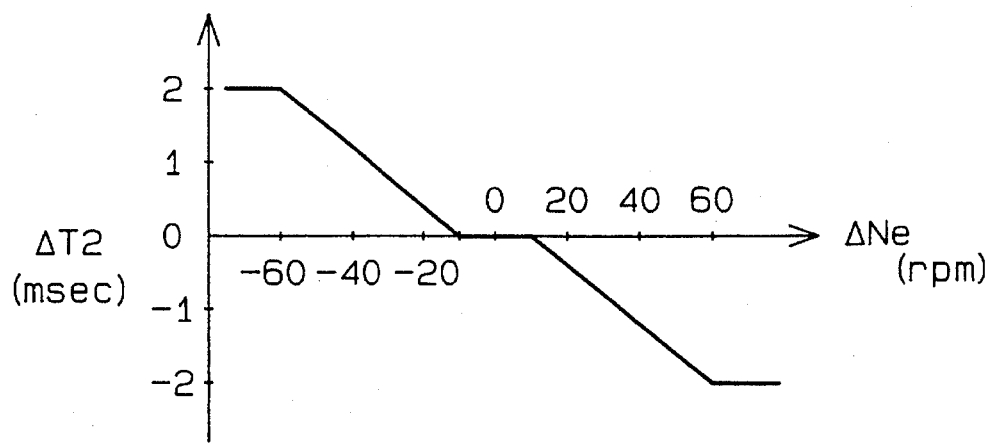
FIG. 19 is a map stored in the ROM of the ECU for setting an amount of correction of the fall correction time according to the difference between actual engine revolutions and the target revolutions.
Figure 20:
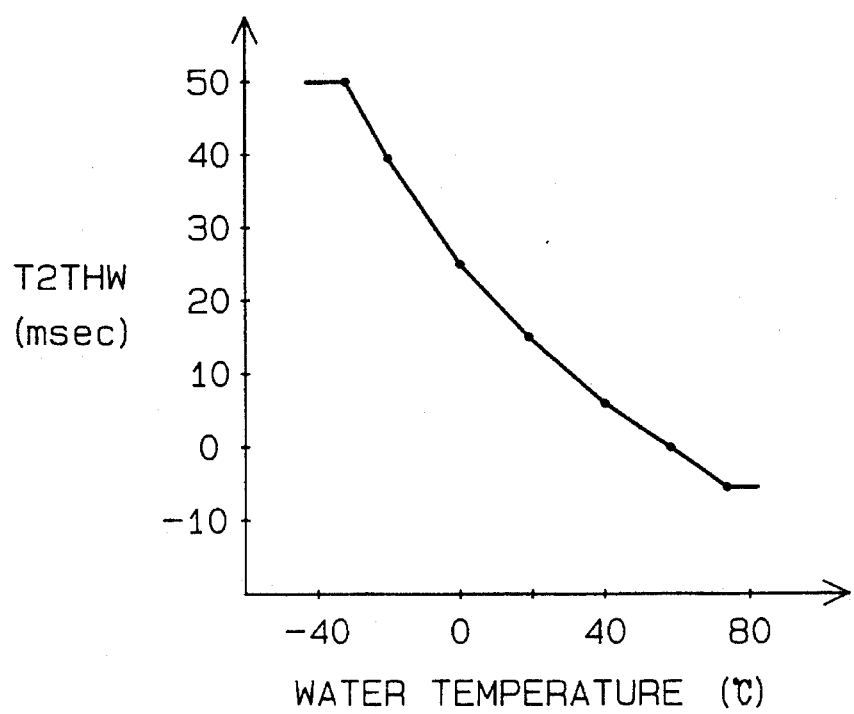
FIG. 20 is a map stored in the ROM of the ECU for setting an amount of correction of the fall correction time according to the cooling water temperature during first idling.

FIGS. 15 and 16 are flowcharts showing the calculation routine of the valve closing time of the first flow control valve 1 executed by the ECU of the fuel injection device of the engine in the first embodiment of the present invention. FIG. 17 is a time chart showing the condition of mixing air supply in synchronization with actual fuel injection of the fuel injection device of the engine in the first embodiment of the present invention. FIG. 18 is a time chart showing a control signal of the injectors and the first flow control valve at low revolutions caused by starting under load of the fuel injection device of the engine in the first embodiment of the present invention. FIG. 19 is a map for explaining that the ECU of the fuel injection device in the first embodiment of the present invention sets the amount of correction of the fall correction time in response to the difference between actual engine revolutions and the target revolutions. FIG. 20 is a map for explaining that the ECU of the fuel injection device in the first embodiment of the present invention sets the amount of correction of the fall correction time in response to the cooling water temperature during first idling.

As shown in FIGS. 15 and 16, the ECU 25 determines whether or not the revolutions Ne of the engine 21 as detected by the rotation angle sensor 28 are equal to or more than 2,000 rpm at the step S201, and when the revolutions Ne are equal to or more than 2,000 rpm, the first flow control valve 1 is maintained in the constant opening condition at the step S202, and terminates this routine. That is to say, as the injectors 23a to 23d as well as the first flow control valve 1 are controlled to open and close in synchronization with revolutions of the engine 21 in the above process from S300 to S1100, higher revolutions of the engine 21 causes a delay in opening and closing of the first flow control valve 1 by the problem of the responsibility. At this point, a large amount of air intake is introduced into the combustion chambers of the individual cylinders in accordance with the opening degree of the throttle valve 22 which controls the amount of air intake, thus controlling the revolutions. It is not therefore necessary to adjust the amount of supply of mixing air (air for facilitating atomization of the fuel injected from the injectors) from the first and second fluid outlets 13 and 15 by opening and closing the first flow control valve 1 when the throttle valve 22 is closed as described later, for example, idling condition.

When the revolutions Ne are less than 2,000 rpm at the step S201, it is determined whether or not the engine 21 is in idling on the basis of the on/off state of an accelerator opening sensor 29 which detects whether the throttle valve 22 is fully open or not at the step S203. If not in idling, regards it as the off-idling state with the revolutions Ne less than 2,000 rpm, and proceeds to the step S204. At the step S204, a predetermined negative set value TA is set as the fall correction time T2. Subsequently, proceeds to the step S205 to set a predetermined positive set value TB as the rise correction time T1, the valve opening time TACV of the first flow control valve 1 is calculated in accordance with the following formula at the step S206, and terminates this routine:

$$TACV=T1+(TAU+TAUV)+T2 \tag{1}$$

Therefore, when the first flow control valve 1 and the injectors 23a to 23d are open at the steps S800 and S900 shown in FIG. 13, the rise of the control signal of the first flow control valve 1 precedes by the rise correction time T1 the fall of the control signal of the injectors 23a to 23d as shown in FIG. 17. On the other hand, when the first flow control valve 1 and the injectors 23a to 23d are closed at the steps S1000 and S1100, the rise of the control signal of the first flow control valve 1 precedes the fall of the control signal of the injectors 23a to 23d by the fall correction time T2, because the fall correction time T2 is a negative value.

Considering the responsibility of the first flow control valve 1, or the influence of inertia of mixing air, etc., the period of the rise correction time T1 is set so that the upstream pressure of the air injection ports provided at the first and second fluid outlets 13 and 15 for supplying assist air to the injectors 23a to 23d by the increase in the opening area of the first flow control valve 1 reaches the maximum value at a time point when fuel injection is actually started (indicated by "a" in FIG. 17). The period of the fall correction time T2 is set so that the upstream pressure of the air injection ports keeps its maximum value until fuel injection is actually finished (indicated by "b" in FIG. 17), and the upstream pressure rapidly drops thereafter.

Consequently, in the off-idling condition with revolutions less than 2,000 rpm, mixing air is supplied mainly during fuel injection and serves as facilitating atomization of the fuel in the same way of the case that revolutions are equal to or more than 2,000 rpm as described the above.

When determining that the engine 21 is in idling at the step S203, proceeds to the step S207 and determine whether or not the feedback condition of idling revolutions is satisfied. As is generally known, the feedback condition was prepared under the condition that the idling revolutions of the engine 25 must be feedback-controlled, and such condition is satisfied, for example, in case a cooling water temperature of the engine 21 is equal to or more than 80° C., or a vehicle speed is less than 3 km/hour. The ECU 25 determines whether or not this feedback condition is satisfied on the basis of the cooling water temperature detected by the cooling water temperature sensor 30 or the vehicle speed detected by the vehicle speed sensor which detects the speed of the vehicle, at the step S207. If the feedback condition is satisfied, proceeds to the step S208.

At the step S208, the target revolutions NT are set, for example, to 700 rpm in accordance with the operating condition of an air conditioner and other electric loads mounted on the vehicle, or the difference of shift position such as N-range or D-range when the vehicle is an automatic transmission automobile. Then, the difference ΔNe between the actual revolutions Ne of the engine 21 detected by the rotation angle sensor and the target revolutions is calculated at the step S209.

$$\Delta Ne=Ne-NT \tag{2}$$

Subsequently, at the step S210, an amount of correction ΔT2 corresponding to the difference ΔNe is set in accordance with the map stored in the ROM of the ECU 25 shown in FIG. 19, and at the step S211, a value calculated by adding the amount of correction ΔT2 to the previous fall correction time T2 is set as the new fall correction time T2.

$$T2 \leftarrow T2+\Delta T2 \tag{3}$$

The same value in the off-idling with revolutions less than 2,000 rpm is set as the rise correction time T1 at the step S205, the valve opening time TACV of the first flow control valve 1 is calculated from the rise correction time T1 and the fall correction time T2 at the step S206, and terminates this routine.

By the above process, a positive value is set as the fall correction time T2, for example, as shown in FIG. 14, and when the first flow control valve 1 and the injectors 23a to 23d are closed by processing the steps S1000 and S1100, the fall of the control signal of the first flow control valve 1 is delayed from the fall of the control signal of the injectors 23a to 23d by the fall correction time T2. This fall correction time T2 is corrected by the amount of correction ΔT2 so as to reduce the difference ΔNe between an actual engine revolutions Ne and the target revolutions NT, and consequently, the engine 21 is maintained at the target revolutions NT of 700 rpm.

Therefore, for example, when sudden steering of the vehicle causes an increase in rotation load of the pump for power steering and the revolutions of the engine 21 sharply decrease (as indicated by C) as shown in FIG. 18, the difference ΔNe of the negative value is calculated at the step S209. A positive value is set therefore as the amount of correction ΔT2 at the step S210, and the fall correction time T2 is delayed at the step S211. Consequently, the increase in the quantity of supplied mixing air increases the revolutions of the engine 21 again, and finally the target revolutions NT of 700 rpm are restored. When an air conditioner is started, the target revolutions NT are set to, for example, 900 rpm at the step S208, and the actual revolutions of the engine 21 are adjusted to 900 rpm by processing the steps S209 to S211.

The fall correction time T2 is not always set as a positive value, for example, when a rotation load acts so as to increase the revolutions of the engine 21, the fall correction time T2 may be set as a negative value, which is contrary to the above, to suppress the increase in the idling revolutions and to maintain the target revolutions NT, and the valve opening time TACV of the first flow control valve 1 may be shorten.

That is to say, when a feedback condition is satisfied during this idling operation, the valve opening time TACV of the first flow control valve 1 is properly corrected by the fall correction time T2, and the revolutions of the engine 21 are maintained at target revolutions NT corresponding to the operating condition of the air conditioner or other electric loads, or the shift position. In this respect, therefore, mixing air serves as keeping idling revolutions at an appropriate value, in addition to facilitating atomization of the injected fuel.

When a feedback condition of idling revolutions is not determined to be not satisfied at the step S207, proceeds to the step S212, at which it is determined whether or not opening control is in an executing condition according to the cooling water temperature of the engine 21. The opening control executing condition is determined by the warming-up condition of the internal combustion engine, including, for example, a cooling water temperature is equal to or less than 30° C. When the opening control executing condition is not satisfied, proceeds to the step S213, at which an amount of correction T2THW corresponding to the cooling water temperature of the engine 21 is set on the basis of a map in the ROM of the ECU 25 shown in FIG. 20. Then at the step S214, it is determined whether or not a load reducing the revolutions of the engine 21 is acting, i.e., whether or not an air conditioner or other electric load mounted on the vehicle is started, or in case that the vehicle is an automatic transmission automobile, the shift position is switched over to D-range. When there is a load, an amount of correction T2LD corresponding to the load is set at the step S215, and at the step S216, the value calculated by adding the amount of correction T2LD to the amount of correction T2THW is set as the fall correction time T2.

$$T2 \leftarrow T2THW + T2LD \quad (4)$$

Subsequently, at the step S205, the same value as in off-idling with revolutions less than 2,000 rpm as described the above is set as the rise correction time T1, and at the step S206, a valve opening time TACV of the control valve 28 is calculated on the basis of these rise correction time T1 and fall correction time T2, thus terminating this routine. When no load is acting at the step S214, the amount of correction T2THW corresponding to the cooling water temperature is set at the step S216 as the fall correction T2.

Here, as the cooling water temperature of the engine 21 become lower, a larger positive value is set as the amount of correction T2THW is set as a larger positive value as shown in FIG. 20, and when the cooling water temperature is equal to or more than about 70° C., i.e., when warming-up of the engine 21 has almost completed, is set in accordance with a negative value. Therefore, when the injectors 23a to 23d and the first flow control valve 1 are closed at the steps S1000 and S1100, and the engine 21 is in cold condition, the rise of the control signal of the first flow control valve 1 is delayed by the fall correction time T2 as shown in FIG. 14, and increase in the amount of supplied mixing air raises the revolutions of the engine 21, thus causing execution of first idling rotation. When the warming-up has been completed, the fall of the control signal of the first flow control valve 1 precedes by the fall correction time T2 as shown in FIG. 17, the revolutions of the engine do down in accordance with a decrease in the supplied amount of mixing air, thus finishing the first idling rotation.

The above amount of correction T2LD is set as a predetermined positive value corresponding to the kind of load, and the valve opening time TACV of the first flow control valve 1 is corrected to extend by adding the amount of correction T2LD. When the amount of supplied mixing air increases, for example, when switching to D-range, idling rotation under the load of a torque converter is prevented from decreasing, and when starting an air conditioner, idling rotation is slightly increased to maintain the cooling ability.

That is to say, when a feedback condition is not satisfied during idling operation, the valve opening time TACV of the first flow control valve 1 is properly corrected by the fall correction time T2, and first idling rotation corresponding to the cooling water temperature is executed. In addition, when an air conditioner or other electric load is started, or when switching to D-range, the fall correction time T2 is corrected to extend, and idling revolutions corresponding to the load is maintained. In this case, therefore, mixing air serves as keeping a proper value of idling revolutions, in addition to atomizing the injection fuel, in the same way of the case that a feedback condition is satisfied.

Figure 22:
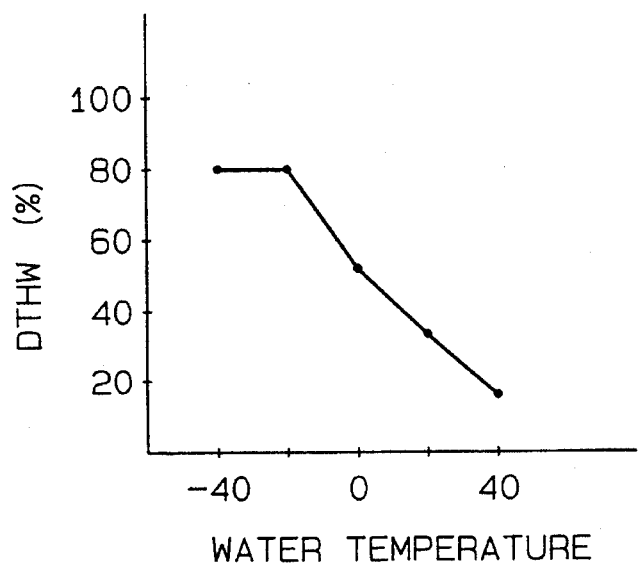
FIG. 22 shows a map for setting a basic duty ratio used for setting an opening of the first flow control valve according to the cooling water temperature.

When the opening control executing condition is satisfied at the step 212, proceeds to the step S217, at which a basic duty ratio DTHW of opening control according to cooling water of the engine 21 is obtained from the map shown in FIG. 22. Subsequently at the step S218, it is determined whether a load is currently applied or not, when a load is applied, proceeds to the step S219, and when no load is applied, proceeds to the step S220. At the step S219, an amount of correction DLD according to the load is read, and proceeds to the step S220. At the step S220, firstly, a duty ratio is first obtained from the following formula:

$$Duty = DTHW + DLD \quad (5)$$

Figure 23:
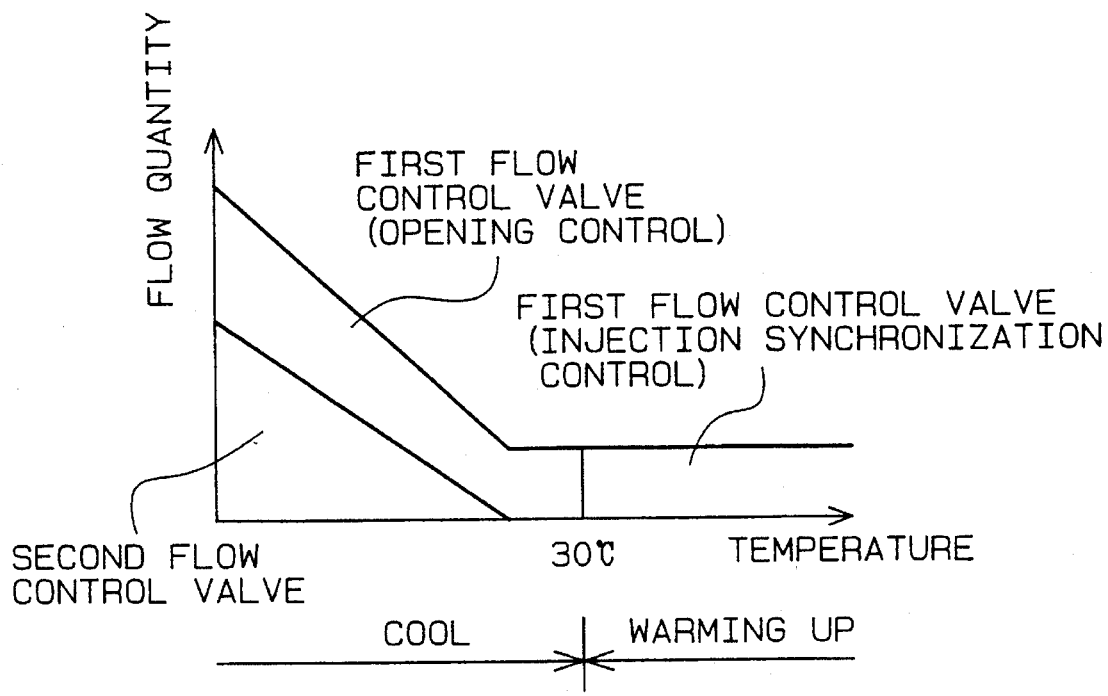
FIG. 23 shows a correlation between the valve opening and the maximum flow quantity to be set according to the cooling water temperature.

The first flow control valve 1 is controlled to opening by an amount corresponding to this duty ratio, thus terminating this routine. Duty ratios according to cooling water temperature are shown in FIG. 22, and a control switching map based on water temperature is shown in FIG. 23.

As is clearly understood from these drawings, as a lower cooling water temperature requires a larger amount of air for idling, a larger duty ratio is also provided. Opening control is executed at a low cooling water temperature, while timed control which supplies air in synchronization with fuel injection is applied at a high cooling water temperature. Thus, as the first flow control valve is not fully opened or closed when cold, air intake pulsation noise is prevent.

Next, the method of actuating the second flow control valve 2 is described. FIG. 8 shows a bimetal 47 which is sufficiently heated by hot water from a hot water passage 50 shown in FIG. 9 and makes the third and fourth valves 44*a* and 44*b* close the second inlet 6 and the third outlet 8. When the cooling water flowing through the hot water passage 50 is at a low temperature and the bimetal 47 is not sufficiently heated, i.e., when the engine 21 is cold, the shaft 41 rotates by the bimetal 47, the second inlet 6 communicates with the second valve chamber 45 and the third outlet 8 communicates with the second valve chamber 45 the second valve chamber 45 at respective opening degrees according to the cooling water temperature. Therefore, it is possible to send air from the third outlet to the surge tank 20 while the engine 21 is cold, and to compensate the amount of the supplied air, which is insufficient with assist air alone.

As a result of the configuration and the actuating method as described the above, the embodiment of the present invention operates as follows as an assist air control valve.

When the engine 21 is cold, in the second flow control valve 2, the second inlet 6 communicates with the second valve chamber 45, and the third outlet 8 communicates with the second valve chamber 45. Here, if the first flow control valve 1 is actuated anticlockwise, the first inlet 3 communicates with the first valve chamber 39 and the first outlet 4 communicates with the first valve chamber 39, thus forming three air flows as follows:

(1) First inlet 3→first outlet 4→first fluid passage 9→first fluid outlet 13;

(2) First inlet 3→first outlet 4→second fluid passage 10→second inlet 6→third inlet 7→third fluid passage 11→second fluid outlet 15;

(3) First inlet 3→first outlet 4→second fluid passage 10→second inlet 6→third outlet 8→third fluid outlet 14.

The first fluid outlet 13 supplies air for assist air to the first and second cylinders, the second fluid outlet 15 supplied to the third and fourth cylinders, and the third fluid outlet 14 supplied to the surge tank.

Next, when the engine 21 is sufficiently heated, both the second inlet 6 and the third outlet 8 are closed in the second flow control valve 2, thereby no air being supplied from the third fluid outlet 14. When the first flow control valve 1 is actuated anticlockwise, air flows sequentially through the first inlet 3→the first outlet 4→the first fluid passage 9→the first fluid outlet 13, which forms the assist air supply passage to the first and second cylinders. Then, when the first flow control valve 1 is actuated clockwise, air flows sequentially through the first inlet 3→the second outlet 5→the fourth fluid passage 12→the second fluid outlet 15, which forms the assist air supply passage to the third and fourth cylinders. It is possible to supply assist air separately to the group of first and second cylinders and that of third and fourth cylinders, by changing the direction of actuating first flow control valve 1.

In the first embodiment, the first flow control valve 1 corresponds to air control valve, the steps S212, S300, S500 and S1000 correspond to the air supply control means, and the cooling water temperature sensor 30 corresponds to the warming-up detecting means, thus they perform these functions, respectively.

Figure 21:
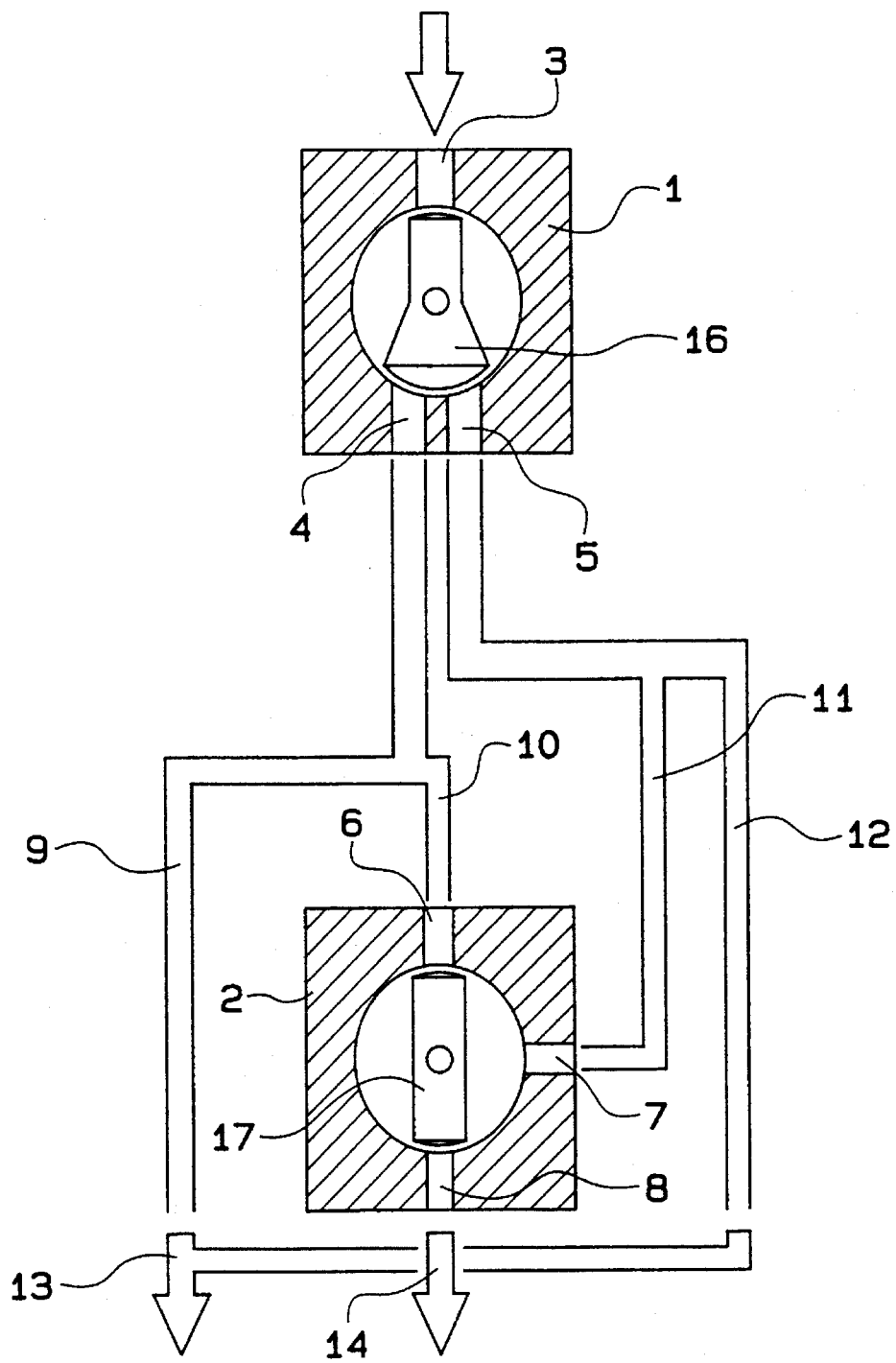
FIG. 21 shows a modification in which an air exhaust sections are not grouped as in the first embodiment.

As described the above, in this embodiment, the present invention is applied to the four-cylinder engine, in which assist air is supplied to one group of the first and second cylinders and to another group of the third and fourth cylinders. The present invention is, however, applicable to a type of non-grouped cylinders as shown in FIG. 21, six-cylinder engine, or other multiple-cylinder engines.

While the third inlet 7 is not provided with a throttle valve in order to simplify the structure in the first embodiment of the present invention, a throttle valve may be provided. A valve timing for closing only the third outlet may be also provided.

The first and second flow control valves are not limited to rotary valves, but may be spill valves, etc. Instead of the bimetal in the second flow control valve, a solenoid rotary valve or the like may be controlled by an ECU.

According to the first embodiment as described the above, as the first flow control valve 1 is opening-controlled when the engine 21 is cold, it is possible to prevent pulsating noise. In addition, as the operation delay is not caused as like full-open/full-close control, it is possible to perform ISC control smoothly. As timed control is performed after warming-up, in case that a flow control valve has the same structure as the first embodiment, the supply of air in an amount exceeding the necessary level is prevented even when an abnormality occurs in the flow control valve in ISC after warming-up, thus preventing overrunning.

In the first embodiment, the air control valve in which the second flow control valve as the air valve is provided at the downstream of the first flow control valve so as to form an integral body, but any other structure may be used for the air control valve.

Next, as a second embodiment in which the present invention is applied to a distribution type air control valve is described with reference to the drawings.

Figure 24:
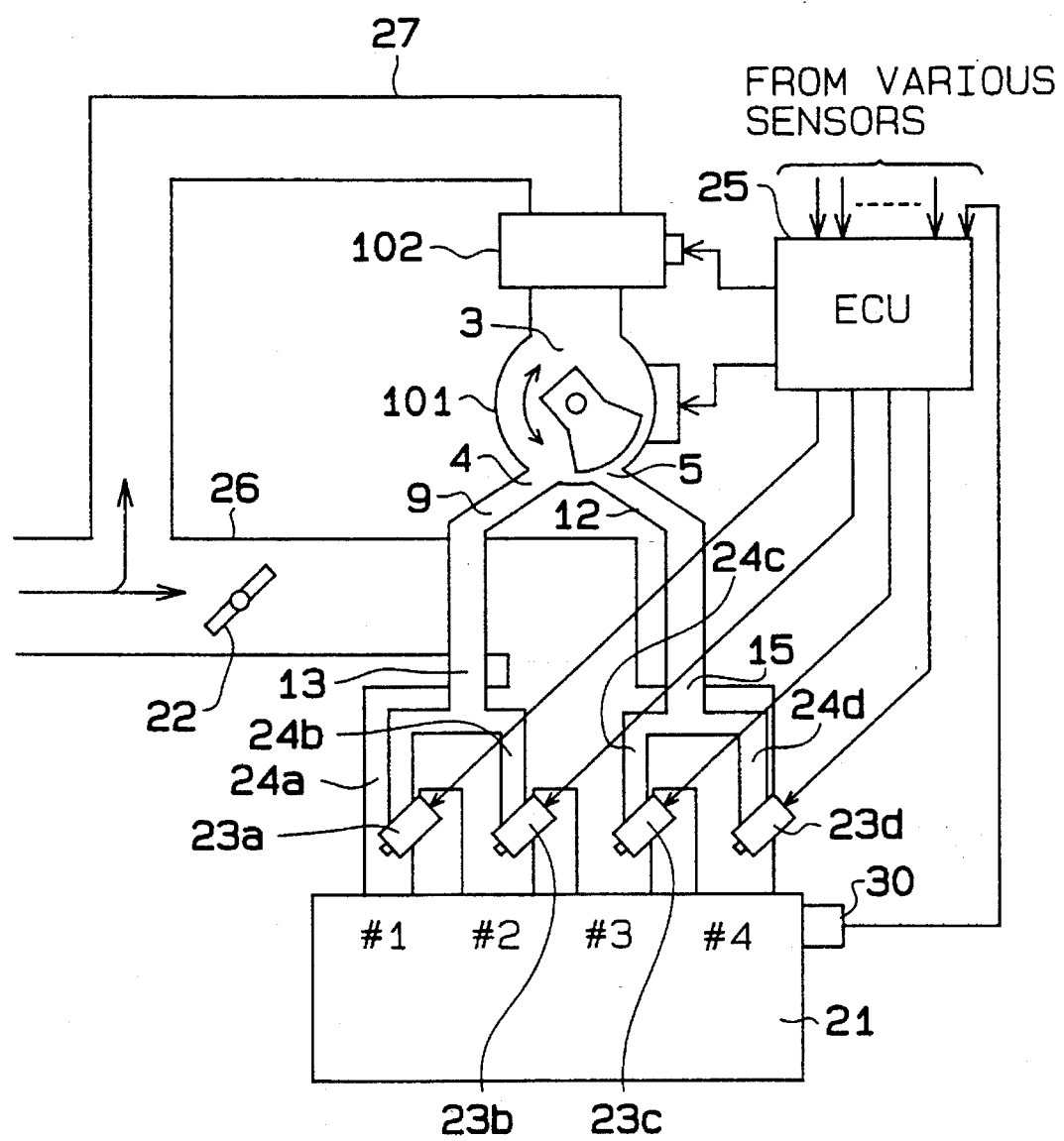
FIG. 24 schematically shows a system in the second embodiment in which the present invention is applied to the fuel injection device of the four-cylinder internal combustion engine.

FIG. 24 shows the second embodiment, in which the same four-cylinder internal combustion engine as the first embodiment is used, the second flow control valve 2 is eliminated, and the first flow control valve 1 is replaced by a distributing valve 101 shown in FIGS. 25 and 26. An air control valve 102 for adjusting amount of air overflowing to the distributing valve 101 is provided at an upstream of the distributing valve 101. Since the other structure is the same as the first embodiment, a detail description is omitted here.

As shown in FIG. 25, the distributing valve 101 comprises a housing 134 having a substantially cylindrical hollow portion 130, a first inlet 3 for introducing air having passed through the air control valve 102 into the hollow section 130, a first fluid passage 9 for guiding air introduced into the hollow section 130 toward air supply passages 24*a* and 24*b* of the first cylinder #1 and a second cylinder #2, and a fourth fluid passage 12 for guiding air introduced into the hollow section 130 toward air supply passages 24*c* and 24*d* of the third cylinder #3 and a fourth cylinder #4. The housing 134 is composed of a rotation shaft 137 which passes through the hollow section 130 in the axial direction and is rotatably supported by bearings 135 and 136 at the both ends thereof, a rotary valve 138 which is fixed to the rotation shaft 137 and opens and closes one or both of the first and fourth fluid passages 9 and 12 by the rotation of the rotation shaft 137, and an actuator 139 which is connected to an end of the rotation shaft 137 and electromagnetically switches over the position of the valve 138 by rotating the rotation shaft 137.

Figure 26A:
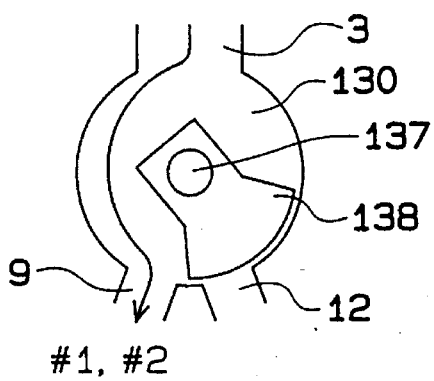
FIGS. 26A to 26D show positions of the distributing valve for explaining operation thereof.
Figure 26B:
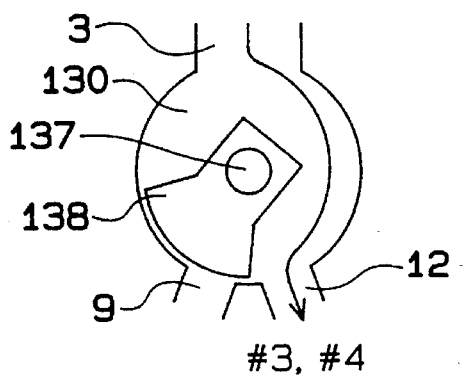
Figure 26C:
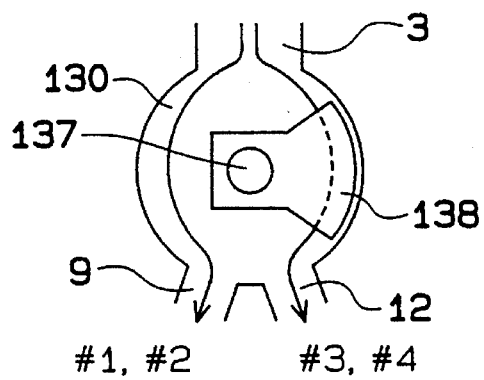
Figure 26D:
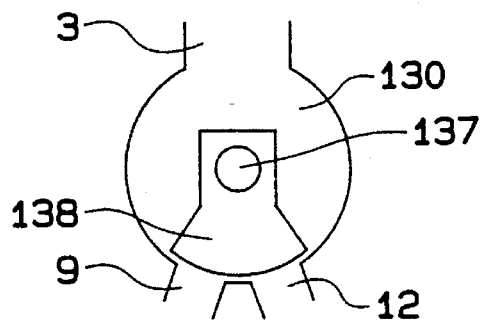

That is to say, the distributing valve 101 can control the position of the valve 138, by switching over the electric current supplied to the actuator 139 to any of: position A, shown in FIG. 26A, in which only the first fluid passage 9 is open so as to supply mixing air only to the first and second cylinders #1 and #2; position B, shown in FIG. 26B, in which only the fourth fluid passage 12 is open so as to supply mixing air only to the third and fourth cylinders #3 and #4; position C, shown in FIG. 26C, in which both the first and fourth fluid passages 9 and 12 are open so as to supply mixing air to all of the cylinders #1 to #4 simultaneously; and the closed position, shown in FIG. 26D, in which both the first and fourth fluid passages 9 and 12 are closed to prevent mixing air from flowing into any of the cylinders #1 to #4.

Figure 25B:
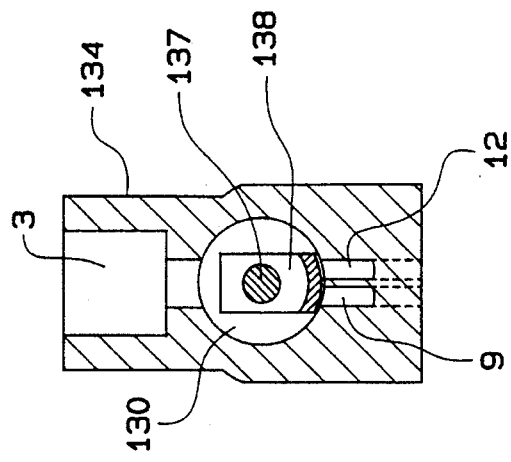
FIGS. 25A to 25C show the distributing valve used in the second embodiment.
Figure 25A:
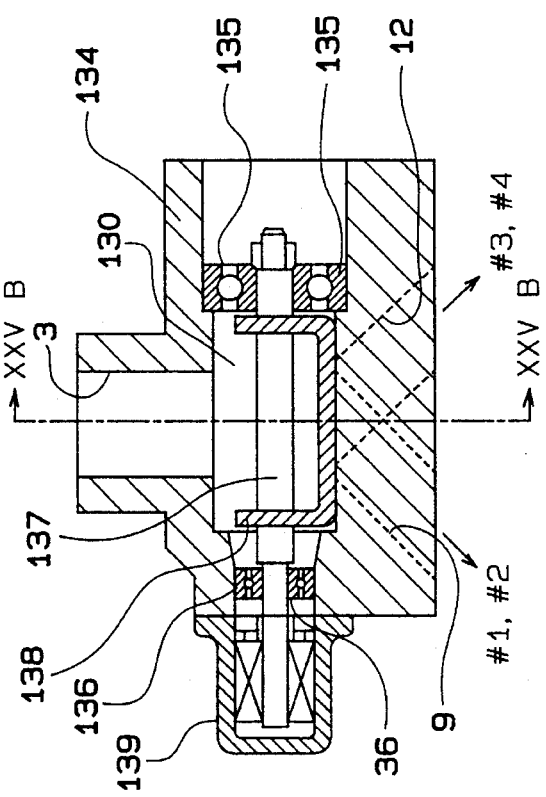
Figure 25C:
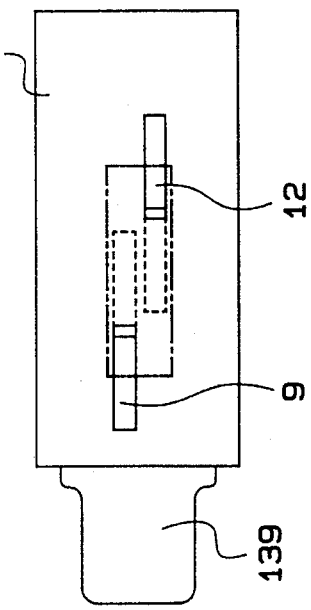

FIG. 25A is a sectional view schematically showing the whole structure of the distributing valve 101, FIG. 25B is a sectional view taken along the line XXV B—XXV B of FIG. 25A, and FIG. 25C is a bottom view showing the positioning relationship between the first and fourth fluid passages 9 and 12. In FIGS. 25A and 25B, the dotted line representing the fourth fluid passage 12 simply shows the position relative to the first fluid passage 9 and is not a so-called hidden line suggesting that the fourth fluid passage 12 is disposed on the other side of the paper. In FIG. 26, although the shape of the valve 138 and the positions of the first and fourth fluid passages 9 and 12 are different from those shown in FIG. 25 this is only to ensure easy understanding of operations of the distributing valve 101.

The air control valve 102 and the distributing valve 101 are actuated by an electronic control unit (hereinafter referred to as "ECU") 25 comprising a microcomputer provided with a CPU, a ROM, a RAM and other components.

Figure 27A:
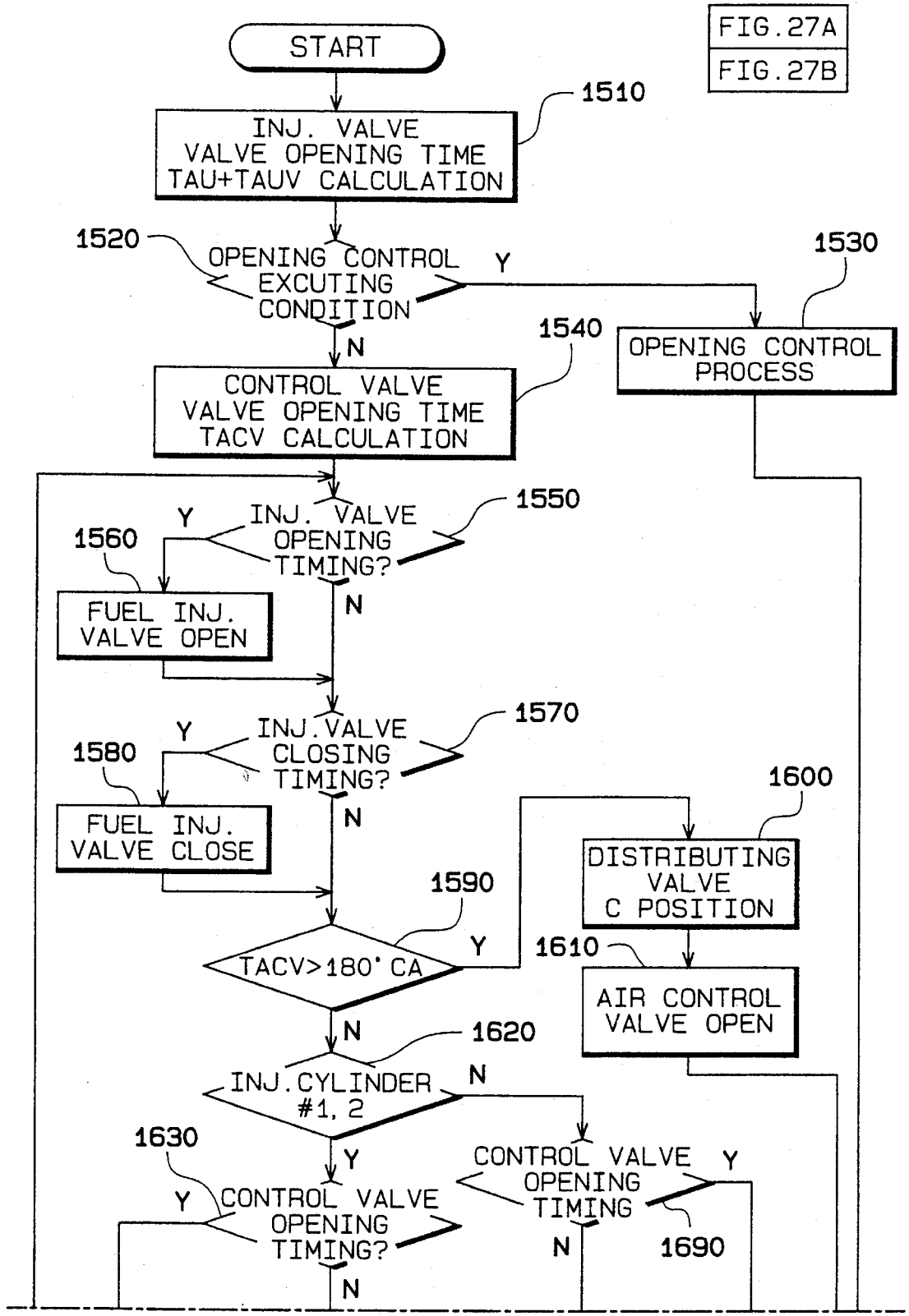
FIGS. 27A and 27B are flowcharts showing the control process executed by the ECU.
Figure 27B:
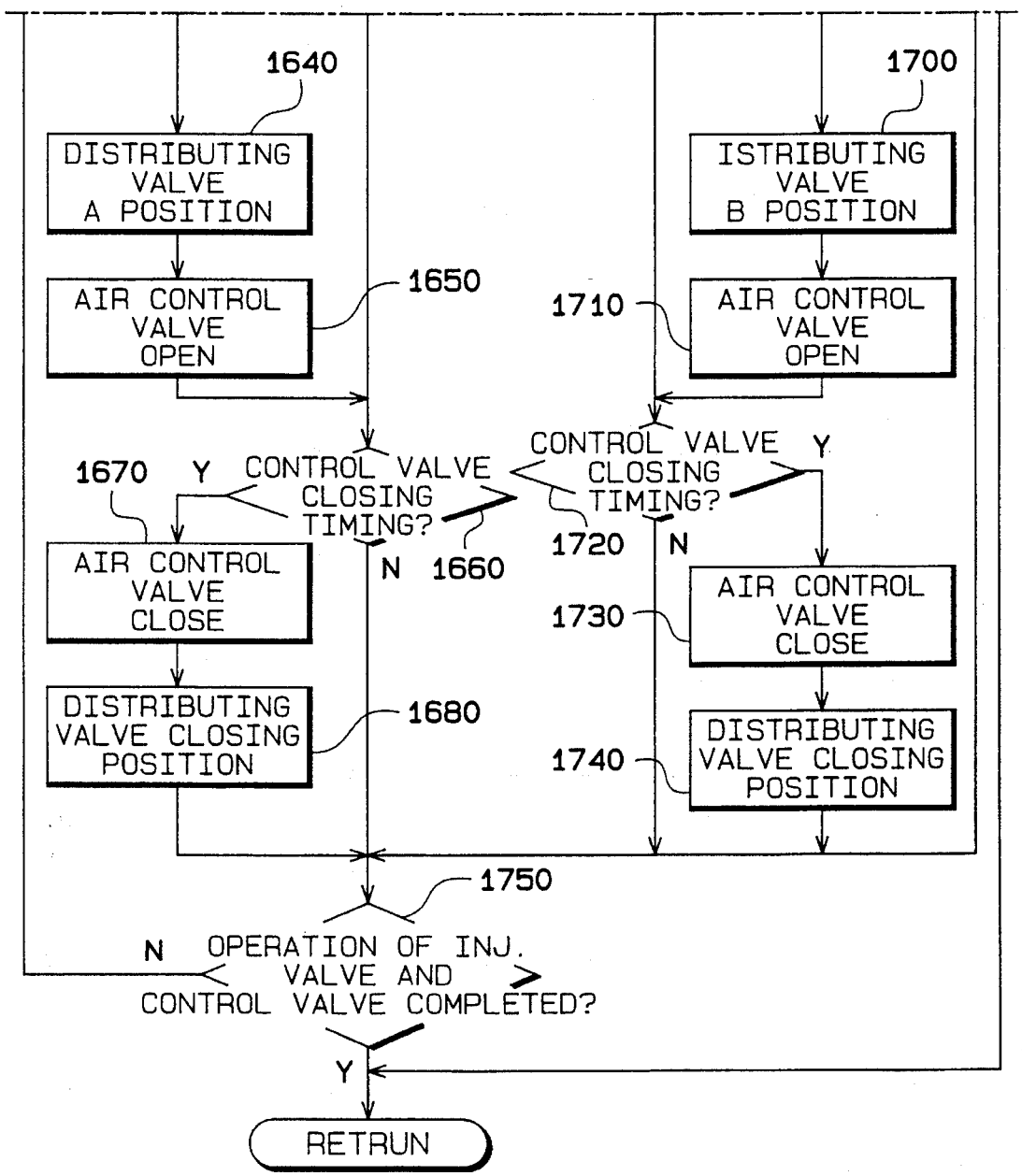

Control process for actuating injectors 23, the air control valve 102 and the distributing valve 101 executed by the ECU 25 is described below with reference to a flowchart shown in FIG. 27.

This process is executed every 180° CA of the engine 21. When starting the process, firstly, the valve opening time TAU for the injectors 23a to 23d according to the operation of the engine 21 is calculated at the step S1510 on the basis of the revolutions of the engine 21, the quantity of air intake, the cooling water temperature and the like. Then, the valve opening time TAU+TAUV which is the exciting time of the injectors 23a to 23d is calculated by adding the invalid injection time TAUV of the injector 4 according to the battery voltage to the above valve opening time TAU.

Figure 28:
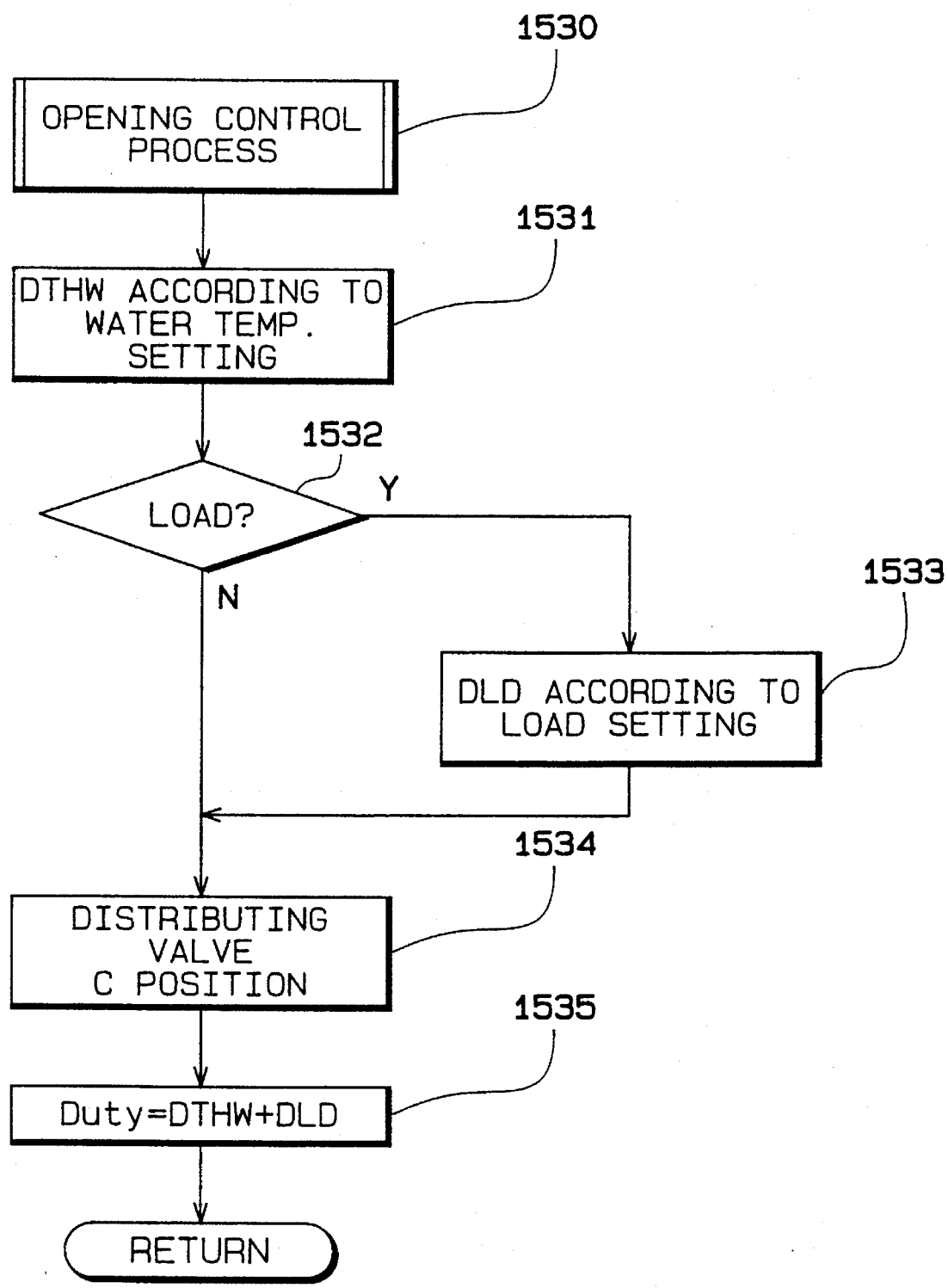
FIG. 28 is a flowchart showing the control process executed by the ECU.

At the following step S1520, it is determined whether or not an opening control executing condition is satisfied. The opening control executing condition means herein the determination of the warming-up condition of the engine 21, such as a cooling water temperature is equal to or less than 30° C. detected by a cooling water temperature sensor 30. If the opening control executing condition is satisfied, proceeds to the step S1530. At this step, the opening control is executed. A flowchart of this process is shown in FIG. 28. The process is described below with reference to FIG. 28.

When executing this process, a basic duty ratio DTHW according to the cooling water temperature is first set at the step S1531 from a map shown in FIG. 22. Then, it is determined whether a load is currently applied or not. If it is applied, proceeds to the step S1533, and if not, proceeds to the step S1534. At the step S1533, a duty correction value DLD according to the load is set from the map, and proceeds to the step S1534. At the step S1534, the distributing valve 101 is actuated and controlled to position C, and at the following step S1535, a duty ratio is calculated from the following formula:

$$Duty=DTHW+DLD \tag{6}$$

Then, the air control valve 102 is opening-controlled by an amount corresponding to this duty ratio, and exits from this routine.

When the opening control executing condition is not satisfied at the step S1520, proceeds to the step S1540. At the step S1540, the exciting time (control valve opening time) TACV of the air control valve 102 which is necessary time for supplying mixing air to the portion near around the injection ports of the injectors 23a to 23d within the fuel injecting time (within the period T0 shown in FIG. 29) during which the injectors 23a to 23d actually inject the fuel is calculated.

Figure 29:
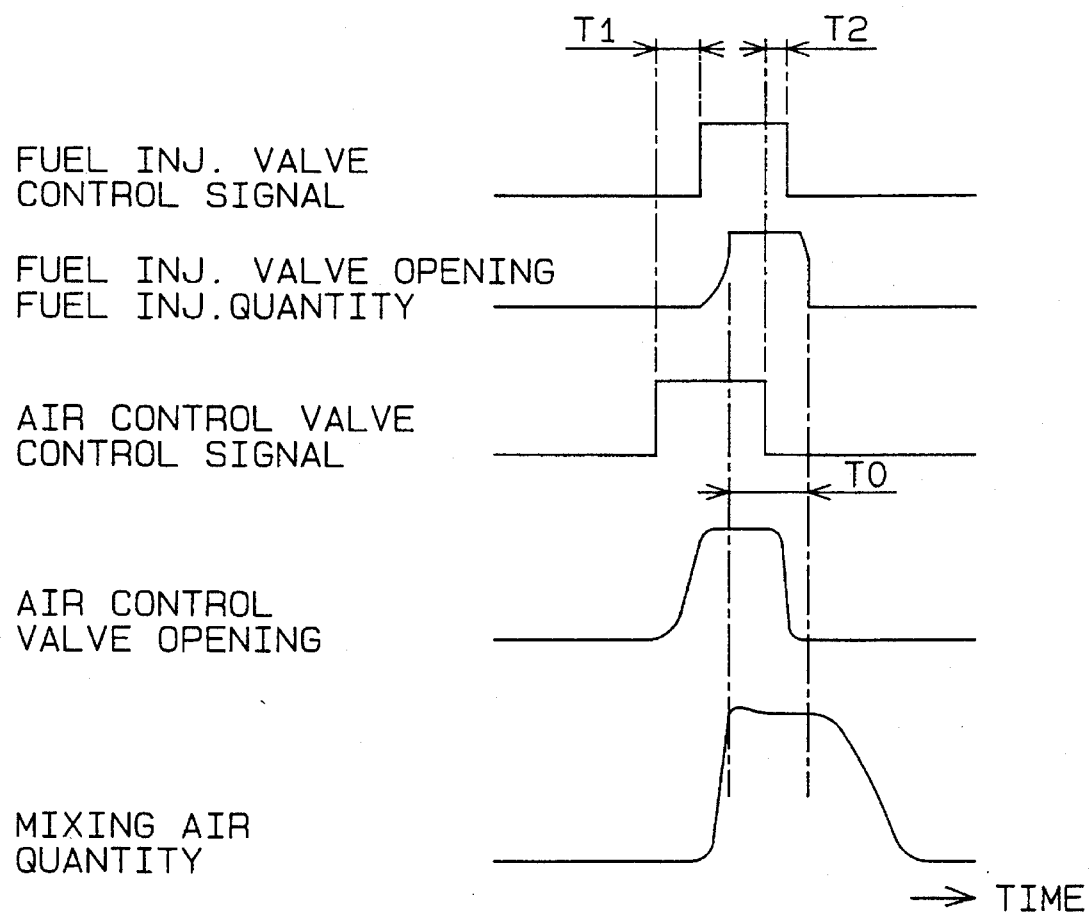
FIG. 29 shows response characteristics and opening and closing timings of the air control valve.

That is to say, as shown in FIG. 29, there is a response delay from the rise of a control signal of the air control valve 102 for opening the air control valve 102 to the actual opening of the air control valve 102. There is also a response delay from the opening of the air control valve 102 to the injection of mixing air to the intake port of the engine 21. There is another response delay from the fall of a control signal of the air control valve 102 for closing the air control valve 102 to the actual closing of the air control valve 102. There is further another response delay from the closing of the air control valve 102 to the end of the injection of mixing air. The control valve opening time TACV is therefore calculated by adding a predetermined rise correction time T1 which indicates how much time the opening of the air control valve 102 should precede the opening timing of the injectors 23a to 23d to the injecting valve opening time TAU+TAUV calculated at the step S1510 and by subtracting a predetermined fall correction time T2 which indicates how much time the closing of the air control valve 102 should be delayed relative to the valve closing timing of the injectors 23a to 23d from the injecting valve closing time TAU+TAUV.

After calculating the control valve opening time TACV at the step 1540 as described above, proceeds to the following step 1550, and determine whether or not the engine is in the exhausting stroke and the cylinder into which fuel should be injected next (injecting cylinder) is in a predetermined opening timing of the injectors 23 (for example, BTDC5° CA). When it is determined that the injector 23 of the injecting cylinder is currently in the valve opening timing at the step 1550, proceeds to the step 1560. At this step, a control signal is raised to open the injector 23 of the injecting cylinder, and proceeds to the step 1570. Contrary to this, if it is determined that the injector 23 has not been in the valve opening timing, proceeds to the step 1570.

Then at the step 1550, during an injector 23 is currently opening, it is determined whether or not the currently opening injector 23 is in the valve closing timing by determining whether or not the opening time has reached the injecting valve opening time TAU+TAUV calculated at the step 1510. At this step 1550, when the currently opening injector 23 is determined to have reached the closing timing, output control signal for closing the injector 23 is dropped, and proceeds to the step 1590. Contrary to this, if it is determined that there is no currently opening injector 23 or the currently opening injector has not reached in the valve closing timing at the step 1570 at the step S1570, proceeds to the step 1590.

At the step 1590, it is determined whether or not the control valve opening time TACV calculated at the step 1540 is over the time required for the engine 21 to rotate by 180° CA. When the control valve opening time TACV is determined to be over the time required for the engine 21 to rotate by 180° CA, the distributing valve 101 is actuated and controlled to position C where mixing air can be supplied to all the cylinders #1 to #4 at the step 1600, and at the following step 1610, a control signal is raised to open the air control valve 102, and proceeds to the step 1750.

At the step 1590, on the other hand, if the control valve opening time TACV is determined not to be over the time required for the engine 21 to rotate by 180° CA, proceeds to the step 1620, and at this step, it is determined whether or not the cylinder into which the fuel should be injected, i.e., the injecting cylinder is one of the first cylinder #1 or the second cylinder #2. When the injecting cylinder is one of the first cylinder #1 and the second cylinder #2, proceeds to the step 1630. At the step 1630, it is determined whether or not the opening timing of the air control valve 102 preceding by the rise correction time T1 the opening timing of the injector 4 of the injecting cylinder is reached.

At this step 1630, if it is determined that the air control valve 102 is currently in the valve opening timing, the distributing valve 101 is actuated and controlled at the step 1640 to position A where mixing air is supplied only to the first cylinder #1 and the second cylinder #2, and at the following step 1650, a control signal is raised to open the air control valve 102, and proceeds to the step 1660. Contrary to this, when it is determined that the air control valve 102 has not reached the valve opening timing at the step 1630, proceeds to the step 1660.

Then at the step 1660, it is determined whether or not the air control valve has reached the valve closing timing by determining whether or not, during opening of the air control valve 102, the valve opening time has reached the control valve opening time TACV calculated at the step 1540. At this step 1660, when it is determined that the air control valve 102 is currently in the valve closing timing, proceeds to the step 1670. At this step, a control signal for closing the air control valve 102 is dropped, and at the step 1680, the distributing valve 101 is actuated and controlled to the closed position, then proceeds to the step 1750. Contrary to this, when it is determined that the air control valve 16 has not currently reached the valve closing timing at the step 1660, proceeds to the step 1750.

Next, at the above step 1620, if it is determined that the injecting cylinder is the first cylinder #1 nor the second cylinder #2, i.e., the injecting cylinder is the third cylinder #3 or the fourth cylinder #4, proceeds to the step 1690, and determine whether or not the air control valve 102 has currently reached the valve opening timing in the same way of the above step 1630.

When it is determined that the air control valve 102 has currently reached the valve opening timing at the step 1690, the distributing valve 101 is actuated and controlled to position B where mixing air is supplied only to the third cylinder #3 and the fourth cylinder #4 at the step 1700. At the following step 1710, a control signal is raised for opening the air control valve 102, and proceeds to the step 1720. Contrary to this, when it is determined that the air control valve has not reached the valve opening timing at the step 1690, proceeds to the step 1720.

Next, at the step 1720, in the same way of the step 1660, it is determined whether or not the air control valve 102 has reached the valve closing timing by determining whether or not, during opening of the air control valve 102, the opening time has reached the control valve opening time TACV calculated at the step 1540. At this step 1720, if the air control valve 102 has currently reached the valve closing timing, proceeds to the step 1730, and a control signal is dropped to close the air control valve 102. Then at the step 1740, the distributing valve 101 is actuated and controlled to the closed position, and proceeds to the step 1750. Contrary to this, at the step 1720, if it is determined that the air control valve 102 has not reached the valve closing timing, proceeds to the step 1750.

Next, at the step 1750, it is determined whether or not all opening and closing operations of the injectors 23, the air control valve 102 and the distributing valve 101 to be executed while the engine 21 rotates by 180° CA have been completed. If all operations of these valves have been completed, the process is temporarily terminated. If these operations have not been completed, proceeds again to the step 1550.

Figure 30:
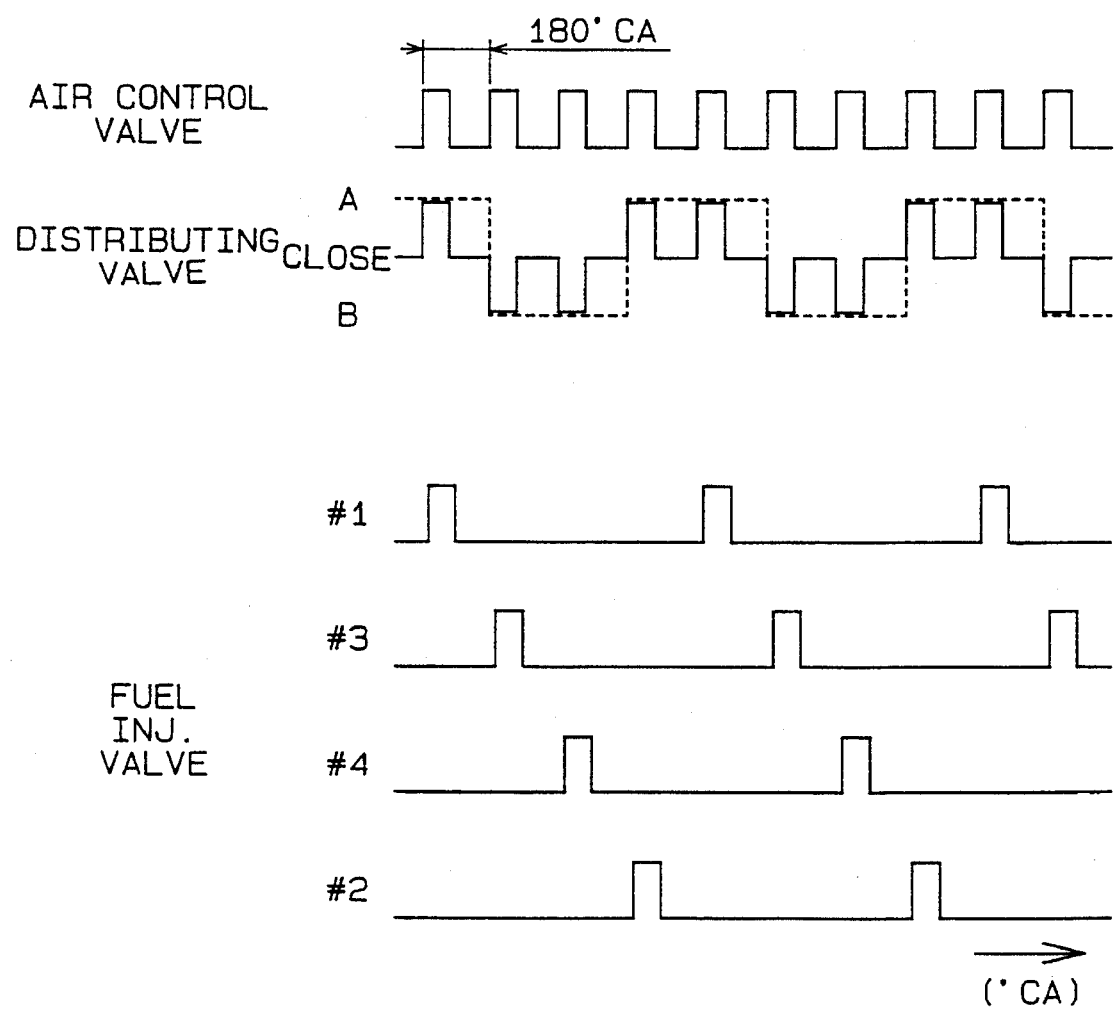
FIG. 30 is a timing chart showing opening and closing operations of the fuel injection valve, the air control valve and the distributing valve by control process shown in FIG. 6.

As described the above, according to the fuel injection device in the second embodiment, an air control valve 102 for opening and closing the air intake passage 27, and a distributing valve 101 capable of switching over between two groups of all the cylinders #1 to #4 of the engine 21 for supplying mixing air are provided in the air intake passage 27 for introducing mixing air near the injecting ports of the injectors 23. As shown in FIG. 30, the air control valve 102 is open in synchronization with fuel injection of the injectors 23, and the valve position of the distributing valve 101 is switched over to a position (position A or B) permitting supply of mixing air to the group of cylinders including the cylinder into which fuel is injected.

Further, as the opening-control of the air control valve 102 is performed when the engine is cold and the timed control is performed after the warming-up of the engine, it is possible to improve controllability of ISC functions when the engine is cold, and to prevent any pulsating noise.

In the second embodiment, the cooling water temperature 30 corresponds to the warming-up condition detecting means, and the steps S1520, S1630, S1650 to S1670, S1690, S1710 to 1730 and S1535 correspond to the air supply control means, thus they perform these functions.

The embodiments in which the present invention is applied to the fuel injection device of the standalone injection type of a four-cylinder internal combustion engine is described as the above. The present invention is, however, applicable to a fuel injection device of an internal combustion engine with a different number of cylinders, so far as it is a fuel injection device of a multiple-cylinder internal combustion engine provided with a injector for each cylinder, or to a fuel injection device of the group injecting type.

Although, in the above embodiment, the air intake passage 27 is connected in the upstream of the throttle valve 22 of the intake pipe 26, and mixing air is supplied by the differential pressure between upstream of the throttle valve 22 (substantially atmospheric pressure) and the intake port of the internal combustion engine 21, the present invention is applicable to an apparatus in which an air pump generating high-pressure air is provided and this high-pressure air from the air pump is supplied as mixing air to the individual cylinders of the internal combustion engine.

According to the above configuration of the present invention, opening of the air control valve is controlled by means of an air supply control means when engine is cold. It is therefore possible to suppress any air pulsating noise due to the frequent full-opening and full-closing control. In addition, as the delay in operation of the air control valve is prevented, controllability of ISC functions is not deteriorated.

When the required air flow gets lowered after the internal combustion engine is warmed-up, it is difficult in opening control to make delicate changes in the amount of air for controlling the flow quantity of assist air and the amount of air for idling rotation control. Therefore, control is switched over to injection synchronization control for such delicate change. It is thus possible to supply preferable quantity of the assist air even after warming-up.

What is claimed is:

1. An assist air control apparatus for an internal combustion engine comprising:

a fuel injection valve for injecting fuel from an injection port into said internal combustion engine, air introducing passage means defining an air introducing portion for introducing from outside air which pressure is higher than that around said fuel injection port and a plurality of air discharging portions for guiding introduced air from said air introducing portion to an opening formed near said fuel injection port for each cylinder, an air control valve disposed in said air introducing passage for opening and closing said air introducing portion, air supply control means for controlling air flow quantity which is supplied from said opening by controlling opening and closing of said air control valve, warming-up detecting means for detecting warming-up condition of said internal combustion engine, and switching means for switching over, in accordance with said warming-up condition detected by said warming-up detecting means, opening control for continuously controlling opening degree of said air control valve when said engine is cold and injection synchronization control for controlling said air control valve to open and close so as to supply air in synchronization with fuel injection of said fuel injection valve after said engine has been warming-up.

2. An assist air control apparatus according to claim 1, further comprising idling detecting means for detecting idling condition of said engine, wherein said switching means performs said opening control or said injection synchronization control when an idling condition of said engine is detected by said idling detecting means.

3. An assist air control apparatus according to claim 1, wherein said warming-up detecting means is a cooling water temperature sensor for detecting temperature of cooling water for the engine.

4. An assist air control apparatus according to claim 1, wherein said engine is a four-cylinder engine and assist air from said air discharging portions are supplied to one group of first and second cylinders and to another group of third and fourth cylinders.

5. An assist air control apparatus according to claim 4, wherein said air control valve is a rotary type valve which is rotatably supported and controlled to supply said assist air to said one group or said another group alternatively.

6. An assist air control apparatus for an internal combustion engine comprising:

a fuel injection valve for injecting fuel from an injection port into said internal combustion engine, air introducing passage means defining an air introducing portion for introducing from outside air which pressure is higher than that around said fuel injection port, a plurality of first air discharging portions for guiding introduced air from said air introducing portion to a first opening formed near said fuel injection port for each cylinder, and second air discharging means for guiding introduced air from said air introducing portion to a second opening formed in an intake passage downstream of a throttle valve, a first air control valve disposed in said air introducing passage for opening and closing a communicating passage between said air introducing portion and said first air discharging portion, a second air control valve disposed in said air introducing passage for continuously controlling an effective cross sectional area of a communicating passage between said air introducing portion and said second air discharging portion, warming-up detecting means for detecting warming-up condition of said internal combustion engine, and first air supply control means for controlling air flow quantity which is supplied from said first opening by opening control for continuously controlling opening degree of said first air control valve when said engine is cold and injection synchronization control for controlling said first air control valve to open and close so as to supply air in synchronization with fuel injection of said fuel injection valve after said engine has been warming-up, in accordance with said warming-up condition detected by said warming-up detecting means, and second air supply control means for controlling said second air control valve such that quantity of air which is supplied from said second opening into said intake passage becomes smaller as said warming-up condition of said engine is progressing.

7. An assist air control apparatus according to claim 6, wherein said warming-up detecting means is a cooling water temperature sensor for detecting temperature of cooling water for the engine.

8. An assist air control apparatus according to claim 6, wherein said engine is a four-cylinder engine and assist air from said first air discharging portions are supplied to one group of first and second cylinders and to another group of third and fourth cylinders.

9. An assist air control apparatus according to claim 8, wherein said first air control valve is a rotary type valve which is rotatably supported and controlled to supply said assist air to said one group or said another group alternatively.

10. An assist air control apparatus for an internal combustion engine comprising:

a fuel injection valve for injecting fuel from an injection port into said internal combustion engine, air introducing passage means defining an air introducing portion for introducing from outside air which pressure is higher than that around said fuel injection port and a plurality of air discharging portions for guiding introduced air from said air introducing portion to an opening formed near said fuel injection port for each cylinder through two passages, an air flow control valve disposed in said air introducing passage for controlling air which is introduced into said opening, a distributing valve disposed in said air introducing passages downstream of said air flow control valve for adjusting distribution quantity of air which is introduced into said two passages, warming-up detecting means for detecting warming-up condition of said internal combustion engine, and actuating means for actuating said air flow control valve to perform opening control for continuously controlling opening degree of said air flow control valve when said engine is cold and injection synchronization control for controlling said air flow control valve to open and close so as to supply air in synchronization with fuel injection of said fuel injection valve after said engine has been warming-up in accordance with said warming-up condition detected by said warming-up detecting means.

11. An assist air control apparatus according to claim 10, wherein said warming-up detecting means is a cooling water temperature sensor for detecting temperature of cooling water for the engine.

12. An assist air control apparatus according to claim 10, wherein said engine is a four-cylinder engine and assist air from said air discharging portions are supplied to one group of first and second cylinders and to another group of third and fourth cylinders.

13. An assist air control apparatus according to claim 12, wherein said distributing valve is a rotary type valve which is rotatably supported so as to control quantity of said assist air supplied to said one group or said another group.

* * * * *